(12) United States Patent
McElvain et al.

(10) Patent No.: US 8,819,608 B2
(45) Date of Patent: Aug. 26, 2014

(54) ARCHITECTURAL PHYSICAL SYNTHESIS

(75) Inventors: Kenneth S. McElvain, Los Altos, CA (US); Benoit Lemonnier, Palo Alto, CA (US); William Halpin, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 617 days.

(21) Appl. No.: 12/177,867

(22) Filed: Jul. 22, 2008

(65) Prior Publication Data
US 2009/0031277 A1 Jan. 29, 2009

Related U.S. Application Data

(60) Provisional application No. 60/951,436, filed on Jul. 23, 2007.

(51) Int. Cl.
*G06F 17/50* (2006.01)

(52) U.S. Cl.
USPC ........... 716/119; 716/104; 716/105; 716/122; 716/123

(58) Field of Classification Search
USPC .......................... 716/104, 105, 119, 122, 123
See application file for complete search history.

(56) References Cited

U.S. PATENT DOCUMENTS

| | | | |
|---|---|---|---|
| 5,712,793 A | 1/1998 | Scepanovic et al. | |
| 6,145,117 A | 11/2000 | Eng | |
| 6,249,902 B1 | 6/2001 | Igusa et al. | |
| 6,360,356 B1 | 3/2002 | Eng | |
| 6,415,426 B1 | 7/2002 | Chang et al. | |
| 6,480,991 B1 | 11/2002 | Cho et al. | |
| 6,493,863 B1 | 12/2002 | Hamada et al. | |
| 6,519,754 B1 | 2/2003 | McElvain et al. | |
| 6,581,191 B1 * | 6/2003 | Schubert et al. | 716/136 |
| 6,711,729 B1 | 3/2004 | McElvain et al. | |
| 7,010,769 B2 | 3/2006 | McElvain et al. | |

(Continued)

FOREIGN PATENT DOCUMENTS

| | | |
|---|---|---|
| CN | 1539114 A | 10/2004 |
| CN | 1656486 A | 8/2005 |

(Continued)

OTHER PUBLICATIONS

Donath et al., "Transformational placement and synthesis", Design, Automation and Test in Europe Conference and Exhibition 2000. Proceedings, pp. 194-201, Mar. 2000.*

(Continued)

*Primary Examiner* — Jack Chiang
*Assistant Examiner* — Brandon Bowers
(74) *Attorney, Agent, or Firm* — HIPLegal LLP; Judith A. Szepesi

(57) ABSTRACT

The present invention discloses methods and apparatuses to design an integrated circuit. According to one aspect, the present invention circuit design discloses an iterative process of synthesis and placement where each iteration provides incremental changes on the design of the integrated circuit. The synthesis transform is then made with accurate timing information from the placement, and the process is incrementally iterative toward the final timing enclosure of the design. The incrementally iterative approach of the present invention provides a continuous advancement from synthesis to placement and vice versa, with the incremental improvements on synthesis made with knowledge of current instance placement, and the incremental improvements on placement made with knowledge of current circuit logic.

24 Claims, 17 Drawing Sheets

(56) References Cited

U.S. PATENT DOCUMENTS

| | | | |
|---|---|---|---|
| 7,047,163 B1* | 5/2006 | Chakraborty et al. | 703/2 |
| 7,143,367 B2* | 11/2006 | Eng | 716/102 |
| 7,337,100 B1* | 2/2008 | Hutton et al. | 703/13 |
| 7,788,625 B1* | 8/2010 | Donlin et al. | 716/109 |
| 7,827,510 B1* | 11/2010 | Schubert et al. | 716/136 |
| 2003/0005398 A1 | 1/2003 | Cho et al. | |
| 2003/0009734 A1 | 1/2003 | Burks et al. | |
| 2004/0083443 A1 | 4/2004 | Ogawa et al. | |
| 2007/0150846 A1 | 6/2007 | Furnish et al. | |
| 2007/0204252 A1 | 8/2007 | Furnish et al. | |
| 2008/0072184 A1 | 3/2008 | Zhou et al. | |
| 2009/0031278 A1 | 1/2009 | McElvain et al. | |
| 2009/0044155 A1 | 2/2009 | Drumm et al. | |
| 2009/0254874 A1 | 10/2009 | Bose | |
| 2012/0110539 A1 | 5/2012 | Birch et al. | |

FOREIGN PATENT DOCUMENTS

| | | | |
|---|---|---|---|
| CN | 1687934 A | 10/2005 | |
| CN | 1851717 A | 10/2006 | |
| JP | 05-342290 A | 12/1993 | |
| JP | 06-266801 A | 9/1994 | |
| JP | 08-202758 A | 8/1996 | |
| JP | 10-171857 A | 6/1998 | |
| JP | 11-085819 A | 3/1999 | |
| JP | 01-142922 A | 5/2001 | |
| JP | 2001-142922 A | 5/2001 | |
| JP | 04-164627 A | 6/2004 | |
| JP | 2004-164627 A | 6/2004 | |
| WO | WO 2007/020391 A1 | 2/2007 | |

OTHER PUBLICATIONS

"ProASIC$^{Plus}$ Actel's 2nd Generation Reprogrammable Flash FPGAs," Actel (now Microsemi), accessed Apr. 28, 2011 at http://www.actel.com/products/proasicplus/, 4 pp.

Eisenmann, H., et al., "Generic global placement and floorplanning," Proc Design Automation Conference, 1998, pp. 269-274.

Hu, Bo, "Timing-Driven Placement for Heterogeneous Field Programmable Gate Array," IEEE/ACM International Conference on Computer-Aided Design, Nov. 2006 (ICCAD '06), pp. 383-388.

Pot International Search Report and Written Opinion for PCT/US2008/008998, mailed Feb. 11, 2009, (11 pp.).

Adya, Saurabh N, et al, "Unification of Partitioning, Placement and Floorplanning," Intl. Conference on Computer-Aided Design (ICCAD 2004), pp. 550-557.

"Amplify FPGA Physical Optimizer User Guide," Chapter 4, Feb. 2004, pp. 12-20.

Chan, Tony, et al, "Multilevel Generalized Force-Directed Method for Circuit Placement," Proceedings of the International Symposium on Physical Design, Apr. 2005, pp. 185-192.

Kahng, Andrew B, et al, "Architecture and Details of a High Quality, Large-Scale Analytical Placer," Proc. ACM/IEEE Intl. Conference on Computer-Aided Design, Nov. 2005 pp. 890-897.

Karypis, George, et al, "Multilevel Hypergraph Partitioning: Application in VLSI Domain," Proc. ACM/IEEE Design Automation Conf., 1997, pp. 526-529.

Maidee, Pongstorn, et al, "Fast Timing-Driven Partitioning-Based Placement for Island Style FPGAs," 40$^{th}$ Design Automation Conference, Anaheim, CA, Jun. 2-6, 2003, 38 pages.

Spindler, Peter, et al, "Fast and Robust Quadratic Placement Combined with an Exact Linear Net Model," ICCAD '06: Proceedings of the 2006 IEEE/ACM International Conference on Computer-Aided Design, Nov. 2006, pp. 179-186.

"Synplicity FPGA Synthesis Reference Manual," Chapter 3, Jan. 2005, p. 48.

"Synplicity FPGA Synthesis Reference Manual," Chapter 7, Jan. 2005, pp. 70-74.

"Synplicity FPGA Synthesis User Guide," Chapter 4, Jan. 2005, pp. 86-102.

"Synplicity's Industry-Leading FPGA Synthesis Product Adds Support for Altera's New Stratix II FPGAs," 2004 Press Release Archive, 2 pages.

Various, The Syndicated, A Technical Newsletter for ASIC and FPGA Designers, vol. 4, issue 1, 2004, 8 pages.

Chinese Patent Application No. 200880100011.X, First Office Action, Issuance date Jan. 29, 2012, 9 pages (English Translation).

Japanese Patent Application No. 2010-518222, Office Action, Issuance date Apr. 12, 2013, 4 pages (English Translation).

Japanese Patent Application No. 2010-518234, Office Action, Issuance date Apr. 12, 2013, 6 pages (English Translation).

Chinese Patent Application No. 2008-80100011.X, Office Action, Issuance date May 22, 2013, 5 pages (English Translation).

PCT International Preliminary Report on Patentability for PCT/US2008/008998, mailed Jan. 26, 2010, (6 pp.).

Chinese Patent Application No. 200880100011.X, Second Office Action, Issuance date Nov. 5, 2012, 6 pages (English Translation).

Betz, V., et al., Architecture and CAD for Deep_Submicron FPGAs, book, Springer Series, 1999, Abstract, 1 page.

Japanese Patent Application No. 2010-518222, Notification of Reason(s) for Refusal, Dated Apr. 14, 2013, 8 pages.

European Patent Application No. 08794712.3, Examination Report, Dated May 7, 2010, 4 pages.

Chinese Patent Application No. 200880100011.X, Fourth Notification of Office Action, Issuance Date Sep. 30, 2013, 4 pages (English Translation).

Japanese Patent Application No. 2010-518222, Preliminary Notification of Reasons for Refusal, Dated Oct. 2013, 8 pages.

European Patent Application No. 08794757.8, Examination Report, Dated May 7, 2010, 4 pages.

Chinese Patent Application No. 200810100093.8, Third Notification of Office Action, Date of Issue Feb. 26, 2013, 8 pages.

Chinese Patent Application No. 2008-20100011.X, Fourth Notification of Office Action, Date of Issue Sep. 30, 2013, 4 pages.

Japanese Patent Application No. 2010-518222, Office Action, Issuance date Nov. 18, 2013, 8 pages (including English Translation).

Japanese Patent Application No. 2010-518234, Office Action, Issuance date Nov. 20, 2013, 4 pages (including English Translation).

Chinese Patent Application No. 2008-80100011.X, Fifth Notification of Office Action, Date of Issue Feb. 8, 2014, 7 pages (English Translation).

Chinese Patent Application No. 200880100011.X, Search Report, Dated Feb. 8, 2014, 3 pages.

* cited by examiner

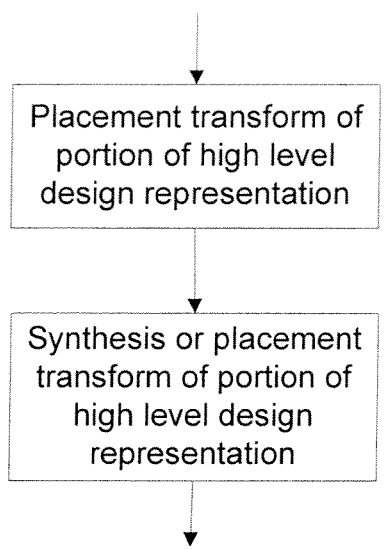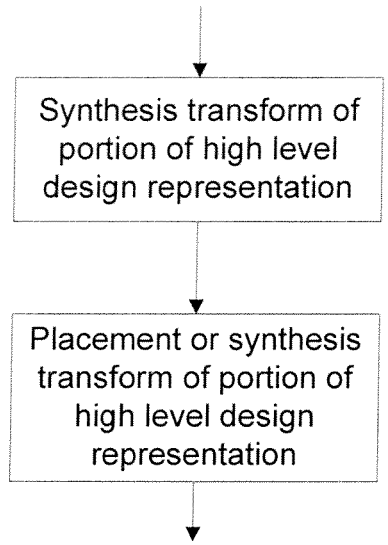
Fig. 5A
Fig. 5B

ARCHITECTURAL PHYSICAL SYNTHESIS

RELATED APPLICATIONS

This application claims the benefit of U.S. Provisional Application No. 60/951,436, filed Jul. 23, 2007 which provisional application is incorporated herein by reference. This application is also related to and is being filed on the same day as application Ser. No. 12/177,869, filed Jul. 22, 2008, entitled: "Architectural Physical Synthesis".

FIELD OF THE INVENTION

The present invention relates generally to the field of designing integrated circuits, and More particularly to the design of integrated circuits through a synthesis process from a high level description.

BACKGROUND

For the design of digital circuits on the scale of VLSI (very large scale integration) technology, designers often employ computer aided techniques. Standard languages such as Hardware Description Languages (HDLs) have been developed to describe digital circuits to aid in the design and simulation of complex digital circuits. Several hardware description languages, such as VHDL and Verilog, have evolved as industry standards. VHDL and Verilog are general purpose hardware description languages that allow definition of a hardware model at the chip primitive level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an RTL netlist from this compilation. An RTL netlist is composed of a plurality of RTL objects, or components, and a plurality of nets which are the signal connections between the components. The RTL netlist can be a technology independent netlist in that it is independent of the technology or architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist which can be used to create circuits in the vendor's technology or architecture, including placing the instances and routing the interconnections so that the circuit meets given timing, space and power constraints.

Early electronic design automation (EDA) totally separates the HDL synthesis from the placement/routing processes as shown in FIG. 1. In operation 11, HDL code is prepared. In operation 13, the HDL prepared in operation 11 is compiled and synthesized to produce a netlist which is typically optimized by performing logic optimization. Thereafter, a mapping process maps the netlist to a specific target technology/architecture. At the end of operation 13, the synthesis has been completed and a netlist which is specific to the technology/architecture used in the vendor's IC is now provided. This netlist is effectively at a gate level with timing analysis estimated by using statistical models of the interconnect properties based on pre-placement information such as fanout count or connected component type and size. After synthesis, a conventional place operation is performed on the logic circuit in operation 15 with local changes to the netlist (at only a chip primitive or cell or gate level) made in operation 17 to meet timing performance. A conventional routing operation is then performed in operation 19 in order to create a design of the circuitry in each of the ICs. If there are any unmet constraints, the process makes modifications with loop back iterations.

Formerly, when instance delays were dominant in the early synthesis tools, the timing estimates based on the statistical models were sufficiently accurate so that the separation of synthesis and placement required relatively few iterations back to the HDL and synthesis stages.

However, with shrinking technology nodes, the interconnect delays become significant, surpassing the gate delays. This results in the delay estimation in the synthesis operation becoming less and less correlated to the actual delays following placement and routing operations, leading to the lack of timing predictability between post-synthesis and post-layout results. Thus in many cases, after the placement and routing processes, the circuit physical layout cannot meet the circuit design criteria, and often the designers must start over from the synthesis step and repeat the synthesis/placement/routing processes.

To improve synthesis, it is important to account for the physical characteristics associated with the design (e.g. placement) during the synthesis process. A series of techniques have been adopted to bring placement information into the synthesis process such as floorplanning, in-place optimization (IPO), and physical synthesis.

In the floorplanning technique, the design is partitioned into regions on the chip and placement based interconnect estimation is used for inter-region interconnect, while interconnect within a region is estimated using statistical models. Floorplans can be used either at the early RTL stages or later after an initial synthesis run. Floorplanning can be extended to partitioning, replicating and slicing of RTL components into regions and combined with RTL level timing and area models. The improved timing from inter-region timing can then be used to more accurately drive RTL level optimizations. Producing a good quality floorplan manually is challenging and requires skilled users. Automatic floorplanners like the one from Tera Systems (U.S. Pat. Nos. 6,145,117 and 6,360,356) can create regions and assign RTL components to them. Because synthesis is decoupled and follows the automatic floorplanning, the accuracy of the timing and area information is poor during the floorplanning.

A technique called in-place optimization (IPO) provides back-annotation of place-and-route delays into the synthesis domain. Critical paths are re-optimized but because detail placement is not updated, interconnect delays for modified nets revert to statistical models. If many changes are made, then the following legalization of the resulting netlist may require moving instances far from their initial positions, resulting in large delay estimation errors. For this reason IPO is seen as unstable when significant changes are required to achieve timing closure.

Another technique is physical synthesis which is an improvement over the IPO technique where a small number of optimizations on a mapped netlist is interleaved with incremental re-legalization to maintain fidelity in the delay and resource metrics. A limitation of this technique is that individual changes are limited to modest increases in resources or the instability problem of the IPO technique re-surfaces. Currently there are several different algorithms for physical synthesis. FIG. 2 shows one algorithm providing a physical synthesis engine using timing estimations based on the proximity of placed instances. After the mapped netlist is initially placed in operation 23, the physical synthesis operation selects portions of the circuit for incremental optimization and re-placement in operation 24 which is performed only at the chip primitive level.

From the foregoing, it can be seen that algorithm improvements for electronic design automation are needed.

Prior patents also relate to or describe chip synthesis, and these patents include: U.S. Pat. Nos. 6,519,754; 6,711,729; 7,010,769; 6,145,117; and 6,360,356. Placement algorithms are recently described in a paper: Bo Hu, *Timing-Driven Placement for Heterogeneous Field Programmable Gate Array*, IEEE/ACM International Conference on Computer-Aided Design, November 2006 (ICCAD '06), pp. 383-388 (ISSN: 1092-3152; ISBN 1-59593-389-1).

SUMMARY OF THE DESCRIPTION

The present invention discloses methods and apparatuses to design an integrated circuit. In exemplary embodiments, the present invention circuit design discloses an iterative process of synthesis and placement, which begins at the RTL or Behavioral level, where each iteration provides incremental changes through transforms of the design of the integrated circuit. In certain aspects, the transform can be either a synthesis or placement transform. A synthesis transform modifies the objects in the netlist and/or the nets forming the connections between the objects. A placement transform modifies the locations of one or more objects in the netlist. The incrementally iterative approach of at least certain embodiments of the present invention provides a continuous advancement using the appropriate synthesis and placement transforms as determined by design metrics such as the current circuit netlist, placement, timing, resource availability, and power. In certain aspects, after each transform, the effected design metrics are updated so that future transform decisions are based on an accurate design statistics. The process is incrementally iterative toward the final timing resource and power enclosures of the design.

A key aspect of at least certain embodiments of the invention is that placement takes place before the specific resource types have been identified for high level components. For example, alternative implementations with desirable weights and associated resource totals for components are cataloged and the placer evolves the placement to move the components near to the resource types for desirable implementations.

In a preferred embodiment, the present invention starts with a graph representing an RTL or Behavioral design (the circuit) and a physical map of chip resources. Iterative transforms are performed where each transform produces an optimization or refinement of the circuit or of the placement of objects in the circuit.

In an embodiment, a transform consists of a high level optimization. This transform optimizes a components or a plurality of components through a rule or mathematical transform into a functionally equivalent alternate set of component(s) that have superior characteristics such as timing, power or resource consumption. An example of such a transform is reorganizing arithmetic expressions to reduce tree height to improve delay. Another example is resource sharing or unsharing.

In another embodiment, the high level optimization transform refines group(s) of circuit object(s) from more abstract forms to more concrete forms. An example of a refinement transform is the mapping of an arithmetic expression onto a DSP resource on the chip. When an abstract form is refined, there are usually many implementation choices. For example, an arithmetic expression could be implemented by a special purpose arithmetic function (a DSP block) on the chip, by table lookup in a memory, or built out of the lower level logic components on the chip (LUTs or gates and flip-flops). Components from a Behavioral Synthesis flow may have multiple implementations registered based on alternative schedules and sharing of resources. Such alternatives for behavioral components can also be dynamically generated based on current available resources and interconnect delays.

In another embodiment, the refinements transforms also have an urgency metric based on the quality of alternative implementations and are selected in order of urgency. The quality of an implementation is measured in terms of design objectives like area consumption, power consumption or timing. Other more esoteric objectives like single event upset hardness can also be included. For example, if a design contains one large memory and several small sized memories, and the large memory has a relatively poor implementation quality when implemented by the logic fabric, it is relatively much more important to associate the large memory with scarce special purpose memory resources on the chip than the medium sized memories in the design. The urgency metric for the large memory would then be much higher than the metric for the small memories. Once components are mapped to a specific implementation and associated with specific resources on the chip, the connections to these components act as anchors for the placement of the remainder of the circuit, improving the quality of the timing and available resource estimation.

In one embodiment, the placement transform can be a refinement of location of one or more placeable objects, to improve placement metrics such as: instance congestion, routability, and circuit performance. A placeable object may consist of a Behavioral synthesis component, an RTL block of unmapped logic, mapped logic, or any combination of these.

In an embodiment, the placement transform is capable of modifying objects of different levels of abstraction. For example, some placeable objects may be RTL blocks, while others may be mapped gates.

In another embodiment, a refinement transform is triggered when the placement is evolved enough locally that one can determine available resources and estimate routing delays.

According to another aspect of the present invention, an exemplary method for designing integrated circuits provides an iteration of incremental transforms where the synthesis and placement transforms are not in any order, but only selected for their functionality. The circuit design automation selects the next transform, either synthesis or placement, based on a choice function. At each iteration, the costs for a predetermined list of transforms are calculated. The cost may include look ahead to the changes in cost of other transforms. For example, if an arithmetic operation is mapped to a ROM, then the ROM option could be removed for implementation of another operation, raising its cost. The best transform is selected based on the cost convergence criteria such as the current placement, netlist, resources, timing or power.

The next transform can be a placement update, a resource assignment, a synthesis optimization, a placement optimization, or a routing update. Thus the state of the IC design progresses incrementally toward the final circuit specification and layout.

In another embodiment, the placement transforms are performed iteratively until critical paths starts to shape or until resources are sufficiently spread according to a predetermined congestion threshold. The criteria for iteration performance are timing, congestion per resource layer, area utilization and power.

The congestion per resource layer can be determined by the use of resource layers. There is a resource layer for each distinct primitive type of resource on chip. For example, today's FPGAs and Structured ASICs have introduced irregular layouts of primitive chip resources. These primitives types include logic (LUTS), flip-flops, special I/O cells like SERDES for high speed serial interconnect, a variety of memory components with different capacities and high speed arithmetic blocks to speed up DSP algorithms. Other than logic and flip-flops, typically, these resources are included in a sparse and possibly irregular fashion. Many FPGAs have a limited amount of RAM, DSP, and other dedicated logic blocks arranged in sparse columns on the chip For example, DSP arithmetic blocks might be available in only 2 columns in the chip layout. A resource layer is a distribution map created for each primitive type and records the available resource locations for that type and the placement of each primitive of that type. A layer is said to be congested if a localized physical region with more usage then supply exists.

In a typical example of this method, an initial state of the design of the integrated circuit is generated from a high level representation with the timing constraints and placement constraints such as IO pins, existing floorplan or existing placement. The high level representation can be a hardware description language (HDL) code or a technology independent RTL netlist after the compilation from a hardware description language (HDL) code.

In an embodiment, the netlist of the initial state of the design of the integrated circuit is first optimized by a series of neutral optimizations based on timing. The neutral optimizations can be a recovery of any area that can be undone easily such as resource sharing or unsharing; adder tree decomposition which is preferably based on fanout table timing; a resource assignment, a flattening of the netlist to facilitate optimization across the hierarchy; multiplexer extraction or restructuring.

In an embodiment, the general flow of the state of the design of the integrated circuit progresses from a RTL netlist to a decomposition, and factorization, then to a mapped and routed netlist. Placement modifications, resource assignments and area or timing optimizations are performed through the flow.

In an embodiment, the process of refining the placement and circuit architecture repeats until all high level components have been given a specific implementation and resource assignment and the placement has been spread on the chip such that every component has sufficient nearby resources for implementation. A more traditional physical synthesis flow may be used from this point to complete the implementation.

In another embodiment, the applied transforms and their potential alternatives are recorded. The flow may be repeated and the alternative transforms can be applied to achieve better results.

The present invention also discloses apparatuses, including software media which may be used to design integrated circuits. For example, the present invention includes digital processing systems which are capable of designing integrated circuits according to the present invention, and the invention also provides machine readable media which, when executed on a digital processing system, such as a computer system, causes the digital processing system to execute a method for designing integrated circuits.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

FIGS. 5A and 5B show details of a method to design an integrated circuit according to certain embodiments of the present invention.

DETAILED DESCRIPTION

Figure 1:
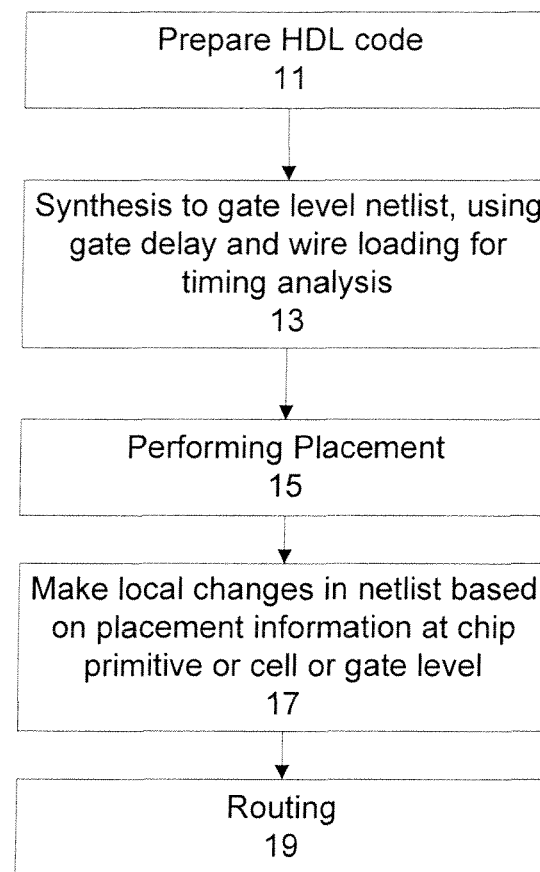
FIG. 1 shows a prior art method for designing integrated circuits.
Figure 2:
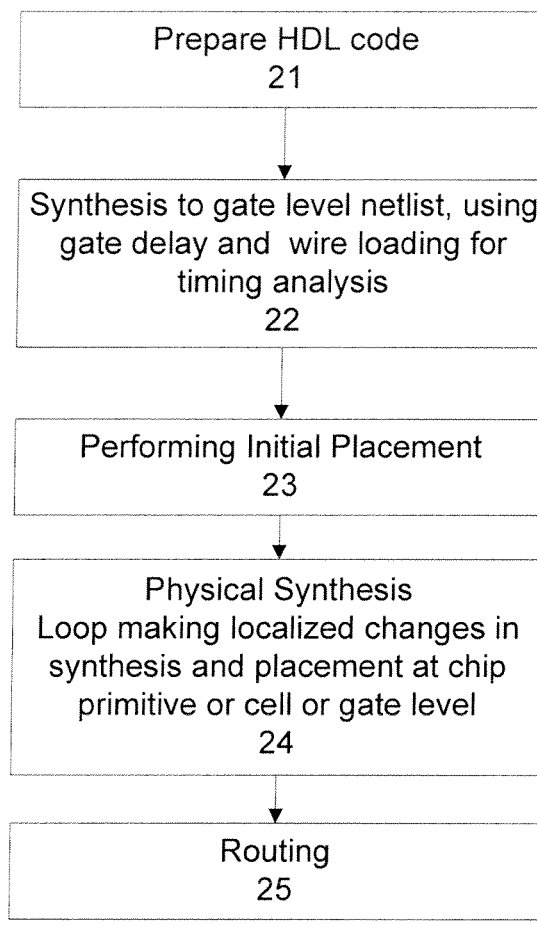
FIG. 2 shows a prior art exemplary method of physical synthesis.

Methods and apparatuses for designing an integrated circuit or a plurality of integrated circuits are described herein. In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

The present invention discloses methods and apparatuses to design an integrated circuit which, in one embodiment, combines placement and synthesis in a single pass. An embodiment of the present invention discloses a physical synthesis process, termed Architectural Physical Synthesis, where the interaction between the synthesis and the placement occurs in an architectural level. This allows synthesis to occur with actual physical placement on a representation of an integrated circuit's substrate, providing synthesis with available local resources and delay estimations closely associated with the actual circuit timings from the placement, and thus the interaction between synthesis and placement can be considered simultaneously. Further, this can provide an automated method to make high level architectural decisions, mapping high level components or making high level circuit transforms in a way that takes into account placement, congestion estimates and the characteristics of the targeted chip architecture including but not limited to the physical distribution of diverse resources, component delays and interconnect delays. According to one aspect of the present invention, it is recognized that given a circuit design, or a HDL code representation, there are a large number of alternative implementations interlinking synthesis and placement, especially for an existing floor plan with given distributed resources. To achieve an optimum design implementation, it is important to be able to back track an earlier synthesis decision based on currently available circuit data such as timing or power, gathered through placement.

Thus in an aspect of the present invention, placement is performed in early synthesis cycles, for example, in circuit architectural level, in high level design or behavioral representation to allow accurate evaluation of the suitability of various design implementations. This is especially important with prediffused chips such as FPGAs and structured ASICs where the resources are not distributed uniformly on the chip. In prediffused chips, the locations of resources and resource types are predetermined and distributed in a sparse fashion. For example, today's FPGAs and Structured ASICs have introduced irregular layouts of chip resources. These components may contain logic, flip-flops, special I/O cells like SER-DES for high speed serial interconnect, a variety of memory components with different capacities and high speed arithmetic blocks to speed up DSP algorithms. Many FPGAs have a limited amount of RAM, DSP, and other dedicated logic blocks arranged in sparse columns on the chip. For example, DSP arithmetic blocks might be available in only 2 columns in the chip layout.

In an aspect, the present invention addresses this change in chip architecture evolution to integrate physical placement and architecture selection at the beginning of the synthesis flow. This requirement can be at the RTL level or at the behavioral synthesis level where the number of required resources of different types are being determined.

The current awareness of the resource layout information and the integration of placement and synthesis at an early synthesis process (e.g. while many components of a design have not had an implementation selected) can provide an optimal utilization of resources. For example, an RTL synthesis process which is not aware of resource layout information may result in an intermediate netlist which over uses some resource types while other resources types go underutilized. Furthermore, the resource type decisions may not be compatible with the physical locations of the resources. For example, more DSP resources may be required in a localized part of the chip than are available. The present synthesis methodology can provide an efficient utilization of these resources by knowing about their distribution on the chip and to know not just that there are enough of a particular resource, but that there are enough nearby. Thus large interconnect delays may be avoided from routing signals to distantly placed resources.

Figure 3:
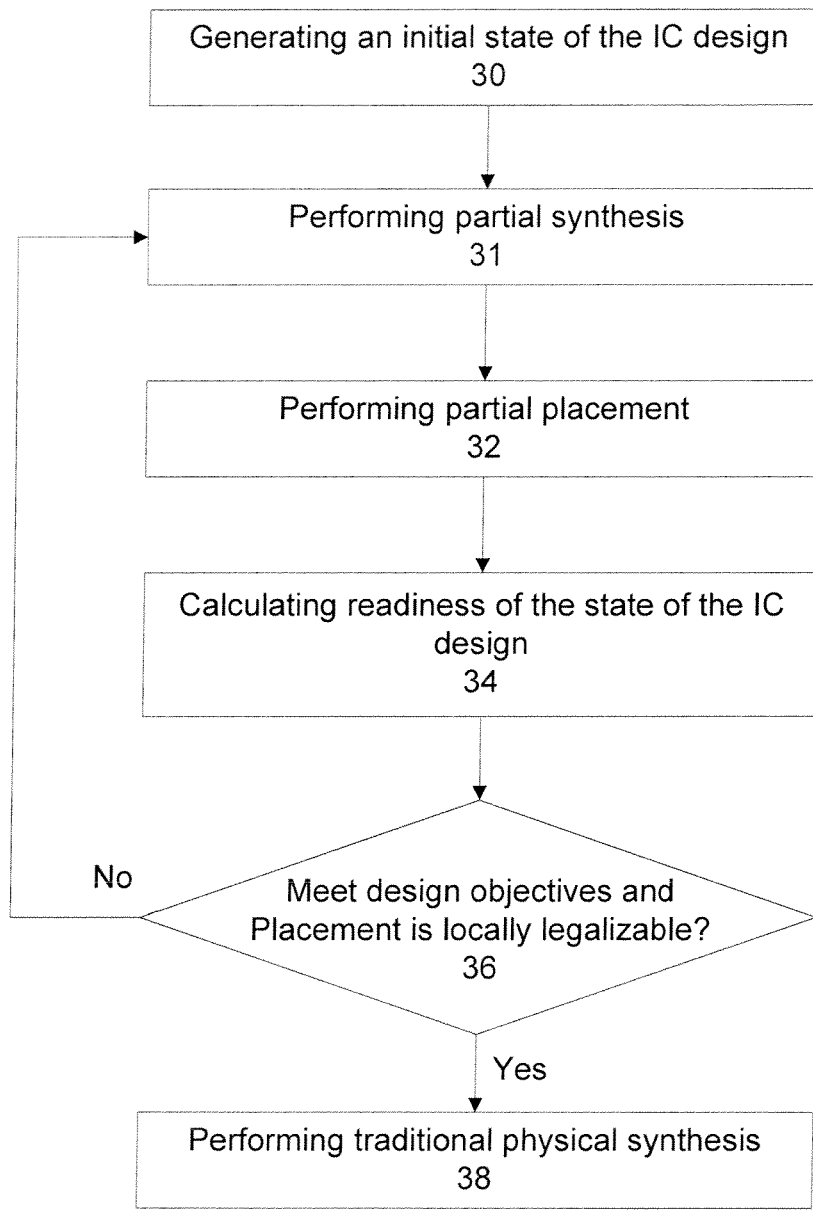
FIG. 3 shows a flow chart of a method to design an integrated circuit according to one embodiment of the present invention.

According to an aspect of the present invention, various placement decisions are determined while synthesis is still at a high level circuit representation (e.g. many components in a design may not yet have a selected implementation), or that a gate-level description is still to be determined. These placement decisions may enable an accurate evaluation of circuit parameters, such as timing delay or power consumption, permitting an incremental path toward an optimum design implementation. In an embodiment, as shown in FIG. 3, the process starts with an initial state of the IC design, which may comprise ESL or HDL language, a behavioral abstraction, or a compiled HDL code to a high level abstraction of RTL netlist, plus timing, floorplan, power and placement constraints in operation 30. In operation 31, a synthesis transform is performed, which, at an early stage of the process, would be a high level transform. This synthesis transform may be for only a portion of the design. In operation 32, placement transforms is performed on the existing circuit representation, and at an early stage, would be a placement at an architectural level. This placement transform may only be for a portion of the design. The placement decisions at this operation might require various assumptions and estimations, since detailed information are likely to be missing at this early stage. The readiness of the IC design state is then evaluated in operation 34, and if it meet design and legal objectives, moves on to traditional physical synthesis in operation 48. If the objectives are not met, as is likely at this early stage, it will loop back to another round of synthesis.

The next iteration of synthesis (current operation 31) would improve the design representation, especially after being provided with physical placement information (previous operation 32). And similarly, the next iteration of placement (current operation 32) would improve its estimation of circuit parameters after being provided with an improvement of synthesis. With such intimate loops, synthesis and placement can work closely together to provide a path to an optimal design representation without significant rework.

In an embodiment, the synthesis operation provides various implementations for a circuit design representation, and the placement operation can perform circuit parameter analysis to help narrow the options. For example, if implementation #1 is clearly superior, it would be chosen, and narrowing the number of potential implementations to one. Alternatively, if implementation #2 is clearly outside the scopes of the design constraints, it would be eliminated, narrowing the number of potential implementations by one.

According to one aspect of the present invention, an exemplary method for designing a plurality of integrated circuits presents an integrated, interactive and iterative synthesis and placement from an abstract machine specification. In an embodiment, the exemplary method of designing integrated circuits incrementally changes the state of the IC design. Starting from an initial state of IC design, which comprises ESL or HDL language, a behavioral abstraction, or a compiled HDL code to a high level abstraction of RTL netlist, plus timing, floorplan, power and placement constraints, the exemplary method iteratively changes the IC design state incrementally until an optimized design state is reached. The optimized state is preferably a chip primitive level netlist satisfying the timing and placement constraints, which can then be passed to a traditional placement and routing process without any extensive re-works.

Figure 4:
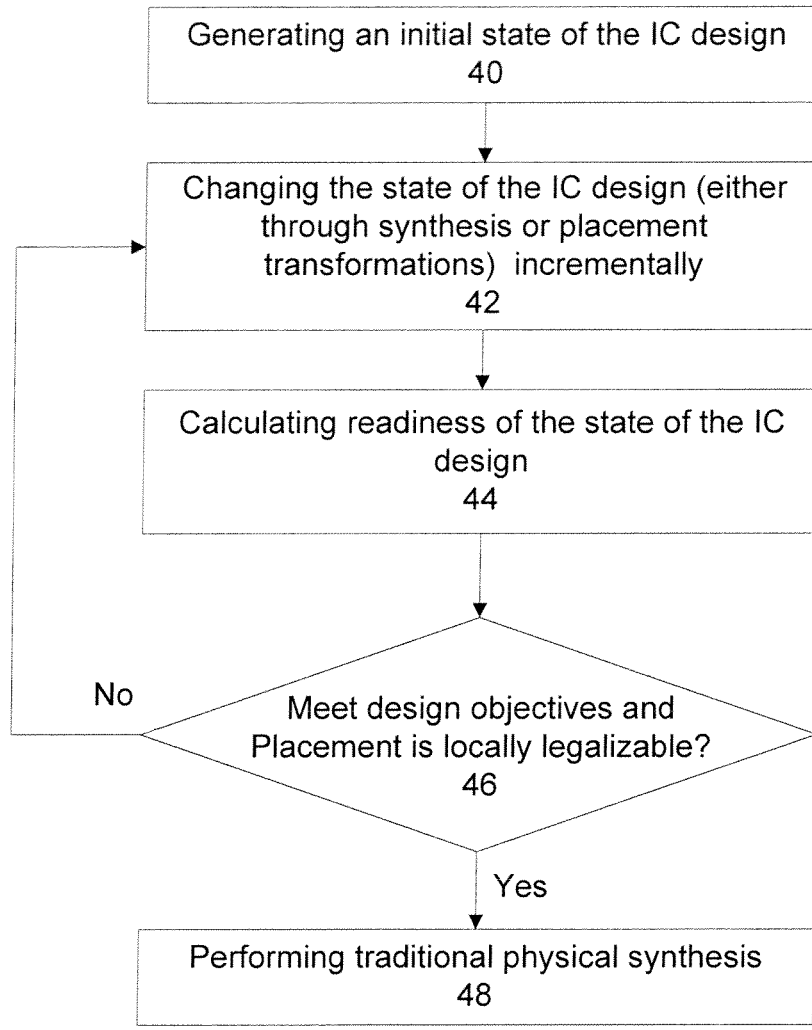
FIG. 4 shows a flow chart of another method to design an integrated circuit according to one embodiment of the present invention.

According to one aspect, the present invention discloses an iterative process of synthesis and placement where each iteration provides incremental changes on the design of the integrated circuit. A general example of certain embodiments of the present invention will be provided while referring to FIG. 4. The method of FIG. 4 begins in operation 40 where an initial state of an IC design is generated. The initial state of the IC design comprises a behavioral representation, or high level RTL netlist, which can be compiled from a HDL source code which describes the circuitry and logic.

The technology independent RTL netlist is typically a higher level behavioral representation of the design. This conserves abstracted information for use by processes before the final mapping step. This differs from traditional synthesis tools that fragment designs into fine, low level (gate) representations immediately after doing language compilation. By preserving a higher level behavioral representation, a synthesis tool can perform optimization, partitioning and floor planning at a much more global level and typically deliver better results. By operating on abstracted data, the synthesis tool can also operate more quickly and handle larger designs. The high level RTL netlist contains high level of abstraction, such as circuit block representation, independent of any particular vendor technology or architecture.

The initial state of the IC design further includes timing constraints, power constraints, and placement constraints, such as IO pin locations, existing floorplan or existing placement (e.g. size and shape of the IC chip, IP blocks). In operation 42, the state of the IC design is incrementally changed. The state of the design of the integrated circuit generally comprises a netlist, timing data, resource information, placement information, routing information, and power data. The incremental changes in the design state can be synthesis or placement modifications, and will be described further below. In one aspect of the invention, the changes are incremental, meaning the design optimizations proceed typically with small modifications with all current information such as timing estimations and placement constraints. The incremental changes allow the design to progress in full confidence that progress is steadily made. In one aspect, the incremental changes involve an incremental global placement algorithm such as the force directed method. In another aspect, the incremental changes involve global optimization algorithm such as simulated annealing. In operation 44, the state of the IC design is evaluated, and a decision is made in operation 46 whether to continue with further iteration by going back to operation 42, or to complete the design flow in operation 48.

The present circuit design method provides a highly integrated and interactive process between the two basic steps in the design of integrated circuits, which are synthesis and physical design (e.g. placement and routing). With the concept that synthesis and placement are strongly interdependent, since design constraints cannot be estimated accurately in synthesis without placement, and placement cannot be performed without synthesis, the present invention design method effectively merges synthesis and placement into one step process with the incrementally iterative approach.

In an embodiment, the present method provides an iteration of synthesis/placement transforms. The body of the iteration process can be a placement transform, a synthesis transform, or a combination of synthesis and placement transforms. In either case, the state of the design of the integrated circuit is incrementally and iteratively changes toward the synthesis or placement of a chip primitive level netlist which meets the design objectives. FIGS. 5A and 5B show two examples of a portion of a flow for designing an IC; in the case of the method shown in FIG. 5A, a placement transform occurs first followed by a synthesis transform while the reverse happens in FIG. 5B. The incremental and iterative transforms of synthesis, placement or synthesis/placement provide a continuous interaction between synthesis and placement at any state of the design. The incremental and iterative progress of synthesis and placement assures that the synthesis transform always have the latest and most accurate design state information, which includes delay information and local resource availability from the placement transform, and where the placement transforms always provides the best estimates for physical placement and wiring information based on the latest synthesized netlist. Placement and synthesis transforms continue until the netlist is composed only of chip level primitives, the design objective are met, and placement congestion is reduced to a level where a detail placer can easily legalize any small local region independently. This flow can be followed by a traditional physical synthesis flow to complete implementation.

Figure 6:
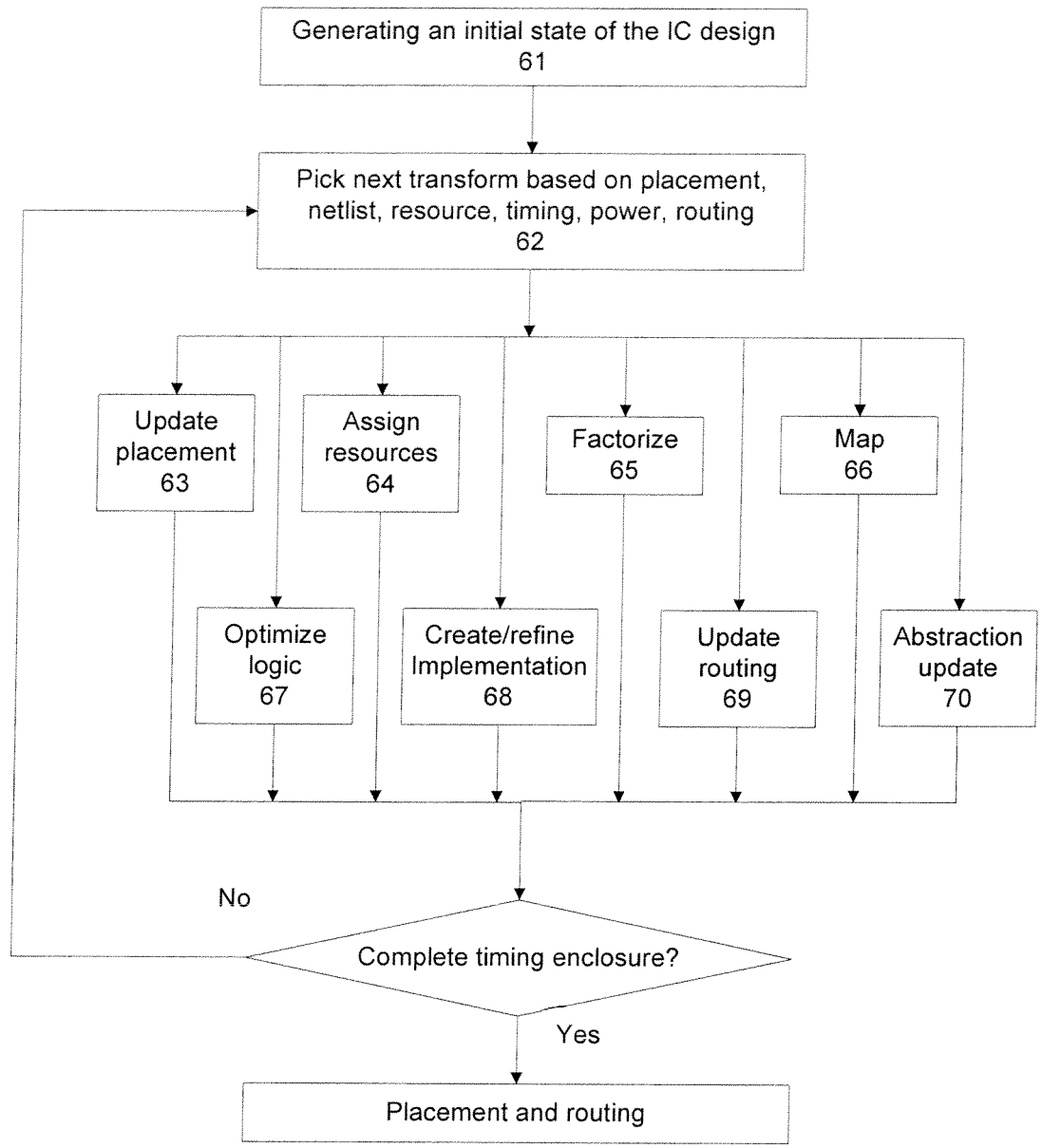
FIG. 6 shows a flow chart of a method to design an integrated circuit according to one embodiment of the present invention.

FIG. 6 shows an embodiment of the present invention for the incremental changes of the IC design state. The present invention can place all levels of abstraction simultaneously. During early iterations, objects at higher levels of abstraction are more prevalent than in the later iterations where the design consists mostly of chip primitives. The chip primitive instances are typically the lowest level of representation. Synthesis transforms gradually modify the netlist, changing the objects at a higher level of abstraction to more concrete objects. These concrete objects have more specific resource requirements which are then taken into account in following synthesis and placement transforms. Placement transforms determine the locations of netlist instances, either RTL instances, unmapped instances, mapped instances, or chip primitive level instances, thereby determining along with the router, the lengths and the delays of the nets in the circuits. The placement transform can gradually iterate the circuit placement toward a legal placement, where legal placement means meeting the rules governing the resource usage of the IC chip. Typically in the early iterations, the placement will be far from legal. Since the placement transform makes incremental changes in object locations, single iterations of the placement transform will not create in a legal placement. It is through repeated placement transforms that the placement will become legal. In this embodiment, the placement transform is central to the present electronic design automation.

In each iteration, the criteria for an iteration can be the timing data, congestion per resource layer, area utilization, power level, or any combination thereof. The method can further comprise a possible inner loop iteration to optimize the design, to shape the critical paths, or to spread the resources to a predetermined threshold.

With an embodiment of the present invention method of incremental iteration of synthesis and placement transforms, physical design information is always available in synthesis transforms in all stages of the design. Thus the optimizations and transformations in the synthesis are always up-to-date on the timing and area, and also on the impact on routability. Decisions regarding the circuit structure made in synthesis are fully in concert with the placement.

The present invention method of incremental iteration of synthesis and placement transforms effectively combines the synthesis and placement transforms to simultaneously optimize the logical structure as well the spatial placement of a circuit. In a typical example of this method, the state of the design of the integrated circuit progresses incrementally toward the final circuit specification and layout.

The progress of the iterative placement transform can be an increasing level of maturity of the netlist or a placement configuration. The maturity of a design is measured by the degree to which the netlist is composed only of chip level primitives, design objective are met, and placement congestion is reduced to a level where a detail placer can easily legalize any small local region independently.

The progress of the iterative synthesis transform can be a synthesis optimization such as restructuring or replication of objects or instances to meet timing constraints. Synthesis optimizations include but are not limited to a circuit optimization, an abstract component decomposition, an arithmetic mapping, an undo/do resource sharing, an adder tree decomposition, an and/or gate decomposition based on placement, path replication, a path detour removal, an assignment to discrete resources such as RAMs or DSPs, a logic factorization, multiplexer restructuring, or a flattening of a netlist to facilitate optimization across the hierarchy.

The embodiment of this method is shown in FIG. 6, which begins with an operation 61 where an initial state of the IC design is generated. The state of the IC design can be a RTL netlist with associated state information such as timing data, resource information, placement information, routing information, and/or power data. Typically, the state of the IC design contains enough information to specify the circuit requirements, such as functionality, timing, power, and floorplan.

High level RTL netlist comprises a netlist of where most of the objects are abstractions of the low level chip primitives. Groups of associated primitives can be represented as objects with higher level of representation, which represent functionality encoded by the RTL. The high-level or abstract representations of the integrated circuit design can be logic objects, representing RTL code or portions thereof. Each object typically represents multiple chip primitives, for example more complex functions such as adders, multipliers, multiplexers, and sequential logic as well as AND functions, OR functions. Objects of high level representations can also include memory blocks or proprietary (intellectual property blocks or IP) blocks. Other logic objects can be portions of RTL code to provide support functions, such as glue logic (providing buffers or interfacing functions), timing logic, control logic, or memory logic. Some of high level RTL objects may also be chip level primitives. The netlist of objects also includes information associated with each object for wiring and placement. The objects can include information to map back to the corresponding RTL code.

Further, RTL code can contain hierarchies, where functions are grouped together. In some situations, components can be re-grouped from one hierarchy to another in order to optimize timing, routing, area, or power requirements. In other situations, functional RTL hierarchy can be flattened, in whole or in part, during the incremental iterative process.

In the beginning, the initial state of the design can comprise constraints, such as timing constraints, power constraints, and/or placement constraints. For example, placement constraints can include locations of IO pins, existing floorplan or existing placement data.

In exemplary embodiments, the initial state of the design is first optimized by a series of neutral optimizations based on timing. The neutral optimizations include any area recovery that can be undone easily, for example, undo/do resource sharing; adder tree decomposition based on fan-out table timing; obvious resource refinements, for example, if there is a huge RAM in the design and there is only one RAM block resource available, the RAM has to go there; flattening of the netlist to facilitate optimizations across hierarchy; and extraction and restructuring of multiplexer structures.

A next transform is selected in operation 62 based on the current design state (the current placement, netlist, resources, timing, power, and routing) to incrementally change the state of the IC design. Operations 63-70 are typical transforms according to an embodiment of the present invention, comprising placement or update placement (63), assign resources (64), factorize (65), map (66), optimize logic (67), create/refine implementation (68) update routing (69) and other synthesis (70). The transforms are typically small, incremental operations to permit the seamless integration of placement and synthesis, as such, synthesis is performed with knowledge of placement, and placement is performed with knowledge of synthesis.

The iterative and incremental transforms 63-70 thus comprise placement and synthesis operations, including optimization transforms such as undo/do resource sharing, adder tree decomposition, AND/OR gate decomposition, logic replication, bit splicing, detour removal, factorization, and placement transforms such as assignment to discrete resources (RAM, DSP, etc.), and routing.

In exemplary embodiments, at each iteration, Operation 62, various potential transforms are evaluated based on a cost function. The cost function is designed to select the best transform to operate first, and therefore includes design state information such as timing, placement congestion, routing congestion, area utilization and power. Upon the evaluation, the best transform is performed and the iteration continues until the design constraints are satisfied. In one aspect, the design then can proceed to traditional gate level placement and routing.

At each iteration, the method runs through a list of selections, and selects the best transform based on a cost function. For example, the choice between a placement transform and a synthesis transform is based on a timing convergence criterion. On a critical path, the placement can attempt to shorten critical nets, if possible. If critical nets cannot be shortened, the nets are available for physical synthesis optimizations.

According to another aspect of the present invention, an exemplary method for designing integrated circuits provides an iteration of transforms where the synthesis and placement transforms are not in any order, but only selected for their functionality. The method provides good integration between synthesis and placement where within the iteration, the next transform is selected based on the state of the design of the integrated circuit, to progress toward the final configuration with timing and placement constraints. In an embodiment, the method provides a transform selection algorithm where the next transform is selected based on certain criteria such as timing, congestion per resource layer, area utilization, and power. The next transform can be an update of placement where the circuit will undergo an iteration to make placement changes for the current netlist with less resource congestion or better meets design objectives. The next transform can be a synthesis optimization, such as a factorization, an optimization, or a decomposition. The next transform can be a synthesis optimization such as splitting, restructuring or replication to meet timing or critical path requirements. The next transform can be synthesis where the current netlist can be mapped into lower level of abstraction, toward chip primitive level netlist for finalize the circuit specification and layout, or updating routing.

The next transform can be a placement optimization such as floorplan partitioning, resource assignment, logic restructuring or replication to meet timing or critical path requirements, or updating routing for the instance placement. The next transform can be a synthesis operation where the current netlist can be mapped into lower level of abstraction, toward a chip primitive level netlist to finalize the circuit specification and layout.

With incremental transforms, design state information, such as timing and power, is up-to-date, and therefore optimizations can be performed with an accurate view of the impact on objectives.

In an alternative embodiment, several transforms are selected. Each selected transform is then applied to measure the impact on the design state and reverted or undone. The best transform is then selected and applied.

In an embodiment, a key step of the present invention is operation 68 which for each RTL object in the netlist creates or refines possible implementation choices. An associated function performs the estimation of the shape and resources required for each of the implementation alternatives. In another embodiment, Operation 68 can also assign weights to each implementation, indicating preferred implementations. One key advantage of the present invention which incorporates synthesis and placement at an architectural level, is that it allows the evaluation of different architectural implementations. Without the present architectural physical synthesis, once an implementation is chosen in the RTL synthesis stage, at the gate level placement stage, it will not be possible to recover the high level information. This could result in suboptimality if the other implementation would have been preferred. Therefore, much better timing results can be attained if implementation decisions are done at RTL level with the physical information. This transformation is very difficult to perform once the circuit has been mapped for the place and route stage.

Figure 10A:
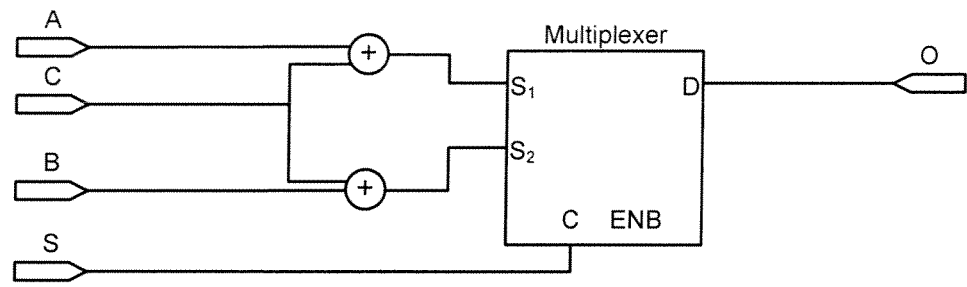
FIGS. 10A and 10B are exemplary resource sharing implementations.
Figure 10B:
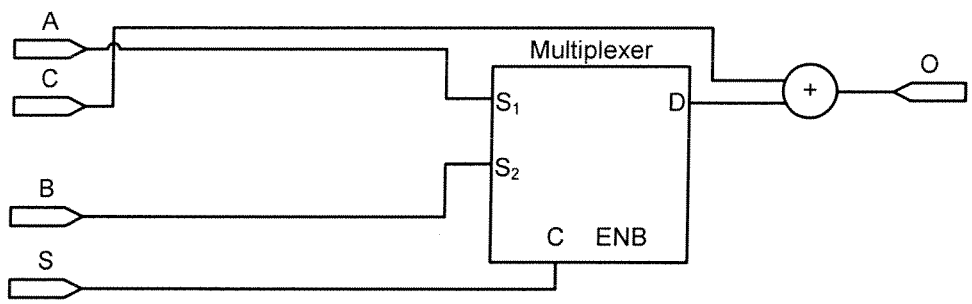

As iterations proceed and the design state refines, Operation 68 eliminates implementation choices with inferior properties. The example of the function F, implementing, F=S & (A*C)||~S & (B*C) will be used to explain Operation 68. If the select signal S is 1, then F is the result of multiplying A and C, while if S is 0 then F is the result of multiplying B and C. Operation 68 determines possible implementation alternatives for this function. FIGS. 10A and 10B illustrate two possible implementation alternatives which the Create/Refine Implementation operation may create for this function. FIG. 10A shows an implementation utilizing two multipliers and a multiplexer which might be desirable if the output F is timing critical and the select signal S has the latest arrival time. FIG. 10B shows an implementation utilizing a single multiplier and multiplexer which would be more desirable if input C is the latest arriving signal or if output F is not timing critical and area reduction is desired. These two alternatives illustrate resource sharing/unsharing. Without concrete information about the timing and placement of the function, a typical high level synthesis algorithm would typically not evaluate an alternative such as FIG. 10A since it uses resources for two very expensive multipliers. This would be the case even in the case where the traditional flow's placement places this function nearby dedicated unutilized multiplier resources, with its output critical and the select signal S arriving after A, B, and C. In this invention, Operation 68 will create both of these implementations, and possibly others, eliminating alternatives when it is clear they are sub par. For example, as iterations proceed, it may become clear that the output F is not critical. In this case, Operation 68 would refine the implementation choice to only that of FIG. 10B since this alternative uses fewer resources. Alternatively, Operation 68 might eliminate the implementation in FIG. 10B if F and the select line S are critical and there are nearby available resources to implement the multipliers.

FPGA chips typically have a plurality of prediffused memory resources, such as flip-flops, and blocks of varying bit sizes, such as 512, 4 K, and MRAMs. The memory components required by a design also vary in size. Typically it is not clear how these memory components should be implemented. For example a moderately sized RAM of between two and 512 bits could be implemented with flip-flops, a 512 resource or even a 4 k resource. Moreover, the resource sites for larger memory sizes are typically only available sparsely on the chip. In previous EDA tools, placement information was not available at the memory implementation stage. Therefore implementation decisions were made without local usage and accurate timing information. This limitation can result in serious performance degradation. If the moderately sized RAM is implemented as a 512 resource and the only available 512 site is located far from the logic to which the RAM connects, forcing the RAM to be a 512 will result in a long interconnect and invalidate the delay benefit of using a 512 site over a flip-flow implementation. Even though the delay of an implementation which uses flip-flops might be longer, if this implementation allows in shorter interconnect between the flip-flops of the RAM and the logic to which the RAM connects, it might result in a faster design. Alternatively, if there is an available 4 K resource nearby the RAM's connecting logic, implementing as 4 K might be advantageous. Thus memory implementation decisions should be made within the consideration of the various available memory resources and the location of components connecting to memory.

Figure 9A:
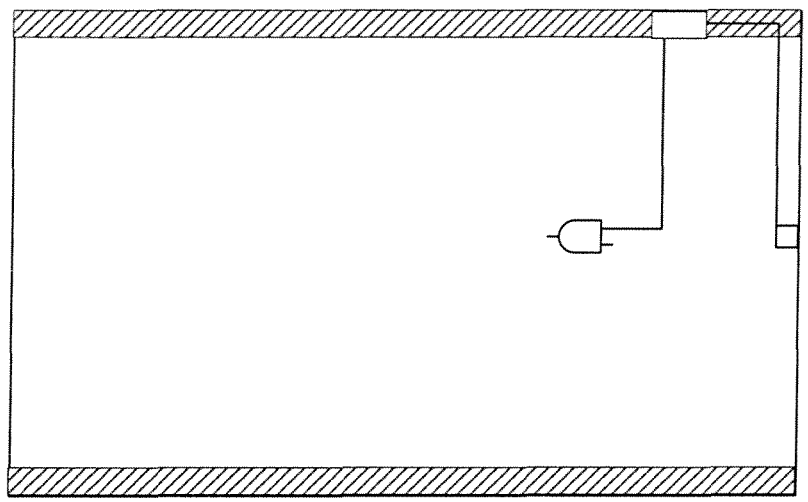
FIGS. 9A and 9B are exemplary mappings of a memory resource.
Figure 9B:
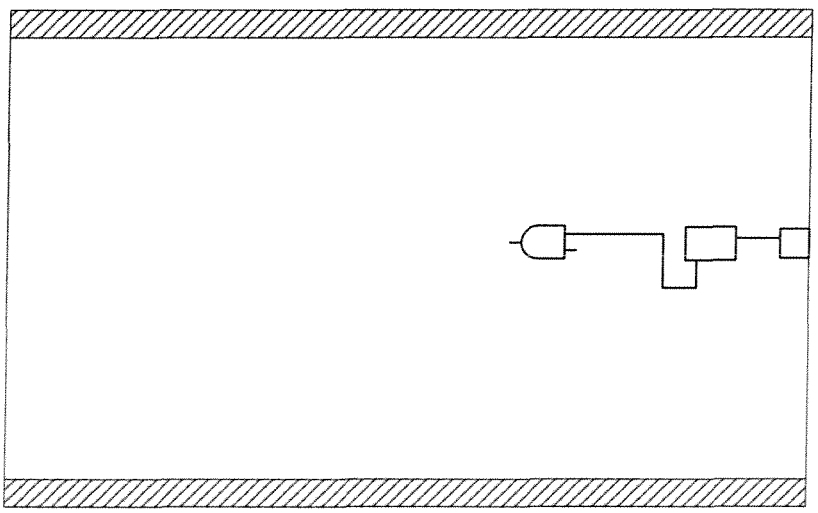

FIG. 9A illustrated an example of a memory implementation decision. The figure shows an exemplary chip with memory resources at the top and bottom of the chip. A 4 bit RAM is connected to a Pad on the right side of the chip and an AND gate. If the RAM is implemented as memory and placed at the top of the chip, it can result in very long interconnects to its Pad input as well as to the AND gate it drives. FIG. 9B shows an alternate mapping of the same logic. The RAM is implemented using nearby logic and as a result, much shorter interconnect and delay.

Closely associated with Operation 68 is a function which estimates the shape and resources required for an implementation. In one embodiment, this function performs a mapping for the purpose of estimation the resources for the RTL component. In another embodiment, this mapping is specific to the target chip architecture. These resource estimates are based upon a synthesis which is designed to estimate the logic requirements and input/output requirements of the particular component in order to implement the module in the target architecture. Further, in one embodiment, the function also estimates the timing transitions for the component.

Figure 7:
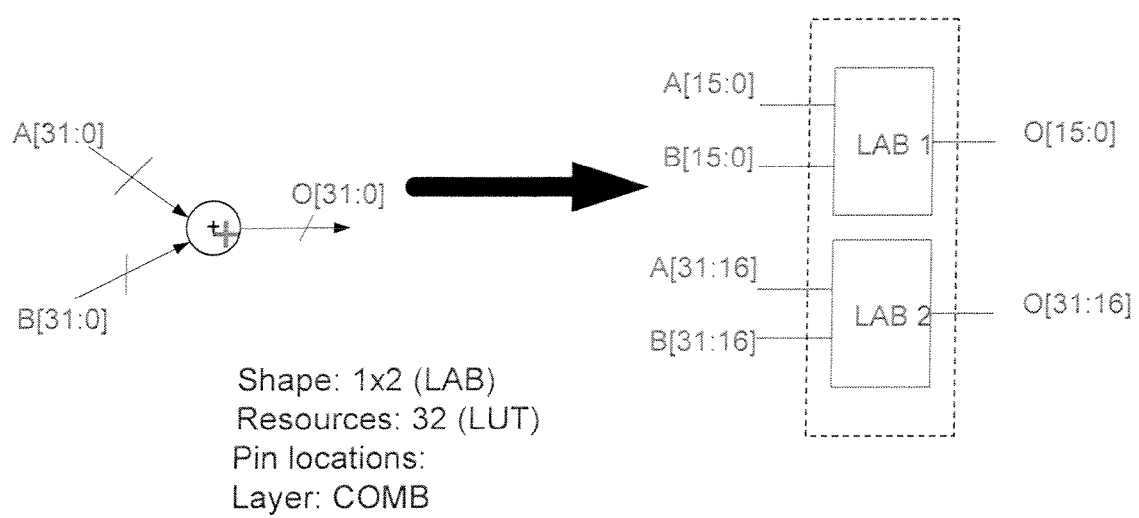
FIG. 7 shows an exemplary estimation of shape and resources.
Figure 8:
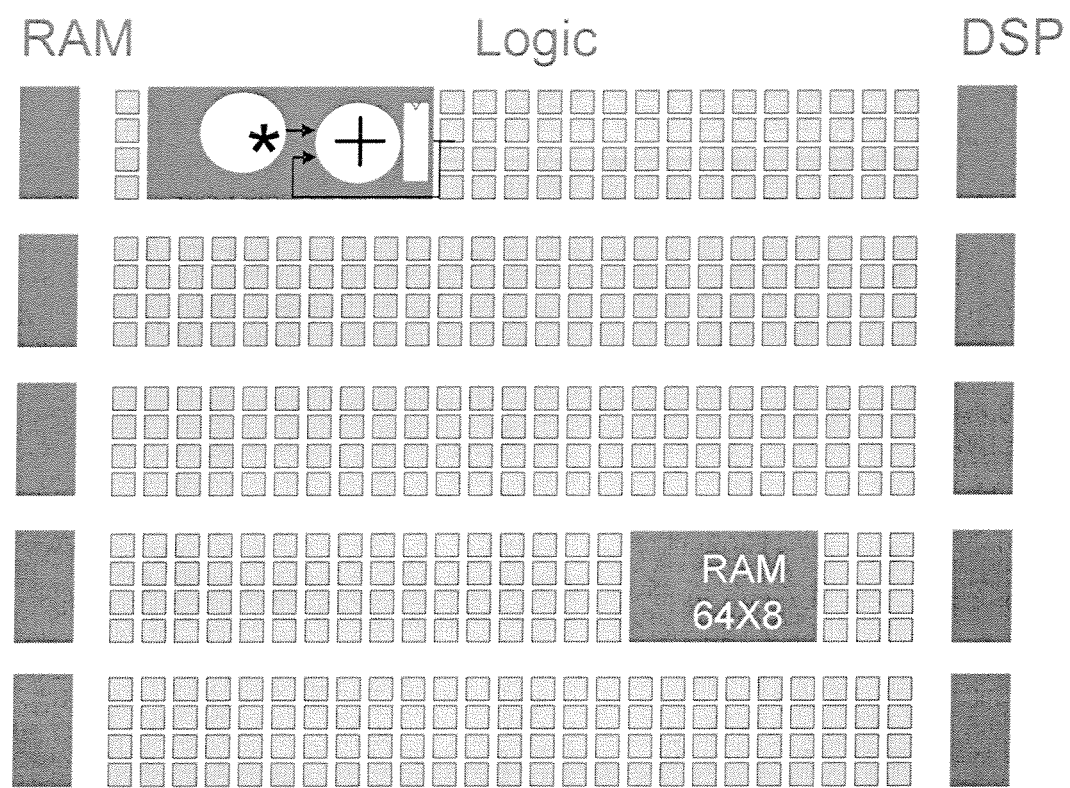
FIG. 8 shows an exemplary mapping for a resource type.

FIG. 7 illustrates an example of an adder which adds two buses, A[31:0] and B[31:0], to produce a third bus O[31:0]. The logic area required to implement the adder is estimated through a transform, estimating the implementation, determining the required resources and the internal transition delays from its inputs to its outputs. In certain aspects, for example, the adder can be implemented using two logic array blocks (LAB), each consisting of 16 look-up tables (LUT).

Operations 65-67 and operation 70 are exemplary synthesis transforms, for example, logic factorization (operation 65), logic mapping (operation 66), logic optimization (operation 67), and abstraction (operation 70) in which the components and connections represented by the RTL netlist are modified resulting in a functionally equivalent circuit which improves the design state, e.g. timing, power. These transforms may add or remove components as well as their interconnections. Transform examples include performing a replication of components, or splitting a unitary RTL component.

The exemplary embodiment represents a very simple case of a very large class of implementation choices that are exist for I/O, memories of different sizes, CPUs, and DSP. Different designs may want to use these resources in differing manners. The present invention's abstraction transform, operation 70, is able to change implementation depending on the timing information, location of connected components, utilization of each resource type, and routing utilization. The abstraction transform is analogous to the create/refine transform, operation 68. While operation 68 creates a plurality of alternate implementations which are maintained and evaluated in future iterations, the abstraction operation, instead, abstracts from a more detailed implementations to an abstraction component. Various implementations of the abstracted component are considered and the best implementation is chosen to replace the original implementation. This ability avoids the alternative, which is to enumerate all of the possible architectural mapping choices and running all of these through mapping, placement and routing.

Figure 11:
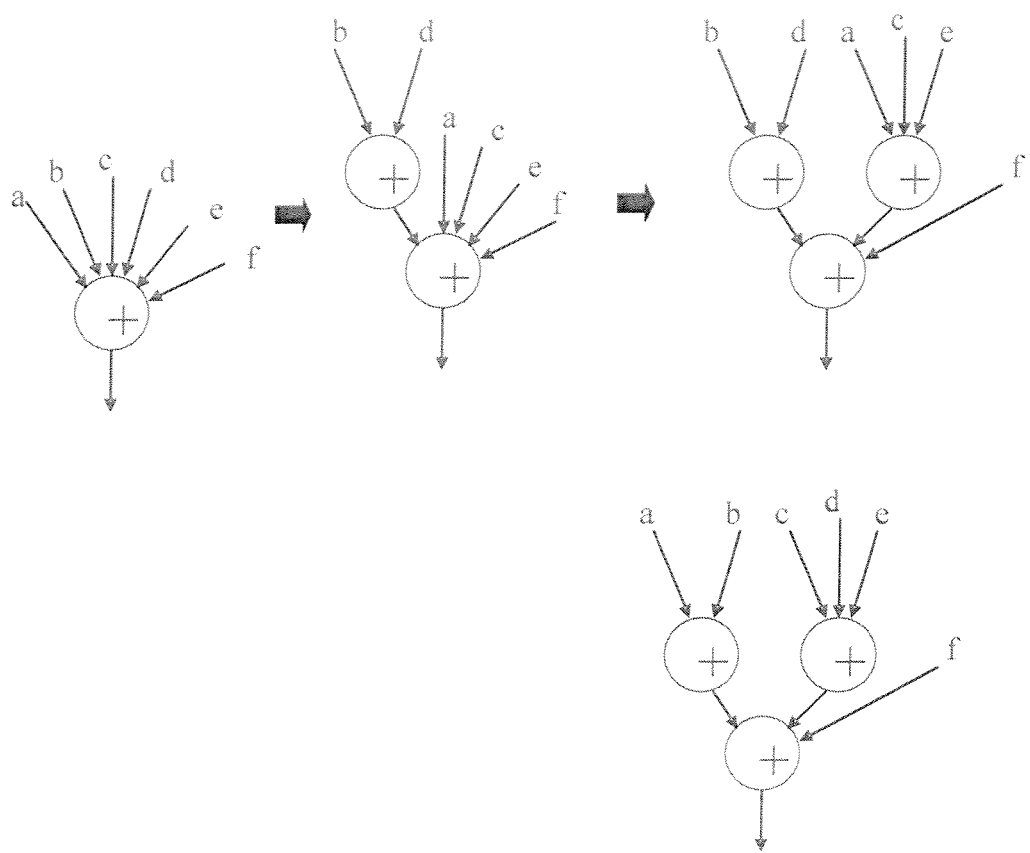
FIG. 11 shows an example of an adder tree decomposition.

An example of the abstraction transform is given in FIG. 11, showing an adder tree decomposition operation. The adder tree decomposition breaks an n input adder into an m input adder tree. Without delay information derived from placement, this optimization would not have information about where the inputs to the adder where located and could only form the tree based on a rough estimate of the input arrival times. In the example, if all inputs are coming from registers, they have roughly the same arrival time. The decomposition will pick (a, b), (c, d) and (e, f) combination for the leaf nodes. However, inputs b and d, a and c may be placed close together. With the placement information, it is better to pick (a, c), (b, d), (e, f) combination for the leaf nodes. This will yield much better timing at the output.

Figure 12:
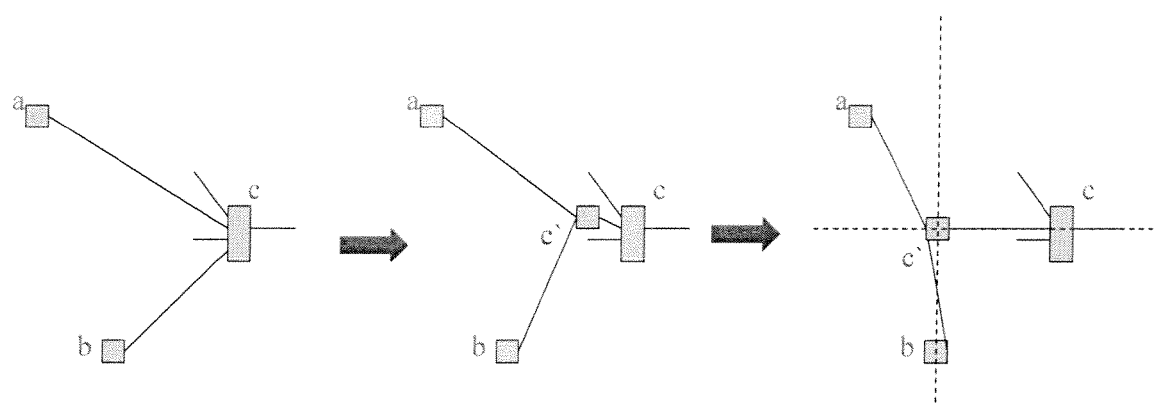
FIG. 12 shows an example of a gate tree decomposition.

Another abstraction example of gate tree decomposition is shown in FIG. 12. A critical step in a synthesis flow is the decomposition of a large gate, with many inputs, such as a 32 input AND gate, into a tree representation. This stage is usually performed once early in the flow and the decision on the tree decomposition does not include any information on the location of the drivers of the large gate. The present invention includes gate tree decomposition and re-composition as transforms, which are placement and timing aware. The least critical earliest arriving inputs are put at the leaf level of the tree and grouped with other nearby less critical inputs. When timing is not a factor, input signals are grouped by the location of the signal's driver.

Figure 13A:
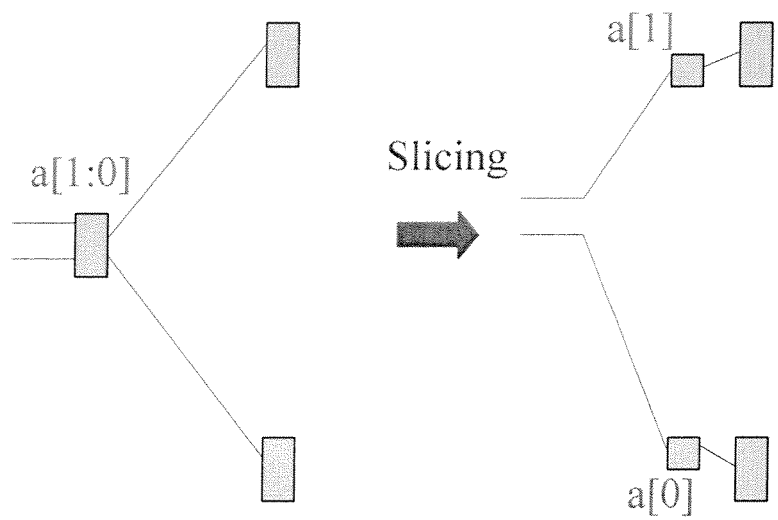
FIGS. 13A and 13B show examples of a slicing optimization.

The optimize logic transform, operation 67 changes the netlist to optimize for design objectives such as timing or power. An example of the optimize transform is the slicing operation as shown in FIG. 13A. If the inputs or outputs of a wide primitive are far apart it can be advantageous to split the primitive. This optimization can only be performed base on placement information. The example below shows a case of this for a 2 bit memory, a[1:0] whose outputs are very far apart. This memory can be split into two flip flops which then can be placed very close to their outputs.

Figure 13B:
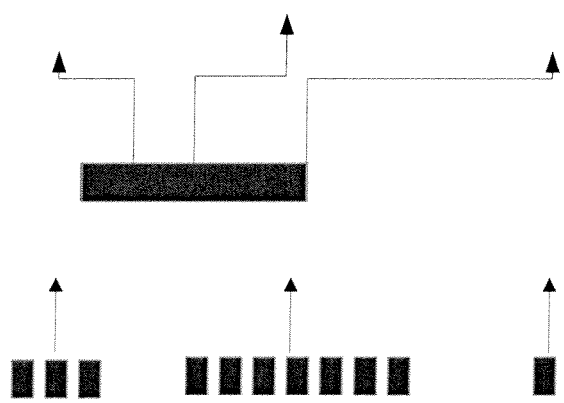

In another example, a component is divided based on the location of its fan-our or fan-in signals. For example, example shown in FIG. 13B shows a memory that has been broken into three clusters based on the location of the fan-out of the memory. Thus the original component, shown as a single box, has been divided to create three new components, sliced accordingly to its corresponding load. Similar divisions can be applied based on the input signals of a component. This optimization is general and not limited to memories.

Figure 14:
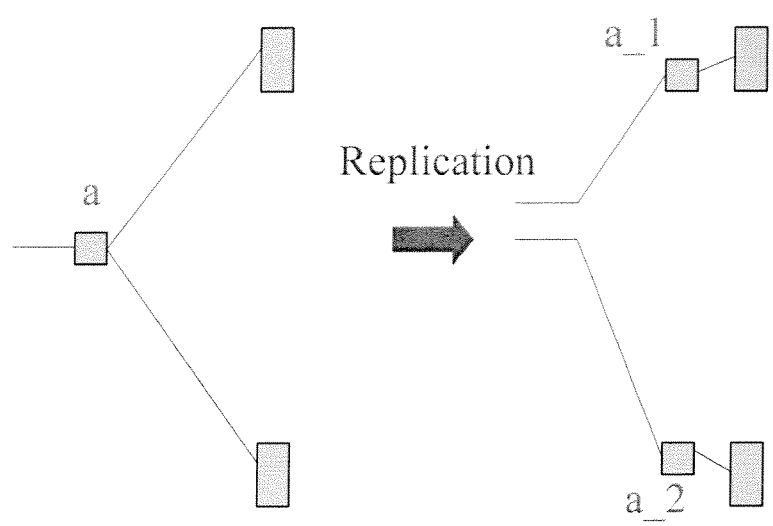
FIG. 14 shows an example of a replication optimization.

Another exemplary operation is the logic replication as shown in FIG. 14. The conditions for replication are very similar to splitting. For a component with inputs or outputs far apart it can be advantageous to make a copy of the component and place it close to a critical load. This optimization can only be performed base on placement information. The example below shows a case of this for a component, a, whose outputs are very far apart. It can be split into two instances a_1 and a_2 which then can be placed very close to their outputs. This is very common when fan-out of the driver is high. Only one copy of the instance is preserved within a given physical range.

Figure 15:
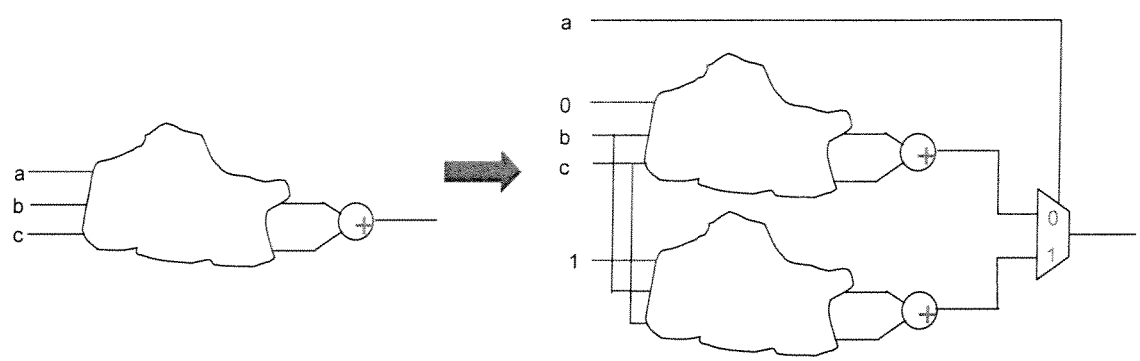
FIG. 15 shows an example of a Shannon expansion.

Another exemplary operation is the Shannon Expansion, shown in FIG. 15. For logic at the input cone of an RTL element with a large delay, such as an adder or a multiplier, critical input nets can be "pulled ahead" to improve timing. The logic is replicated and the critical net is replaced with constant inputs, 0 and 1, and a mux is used to select the output of the two operators with the critical net selecting which operator copy is the output. The two logic copies can be further simplified based on the constant inputs. Again, this is an optimization that is best performed with knowledge of the location of the logic and the drivers of the critical nets driving the logic.

Figure 16A:
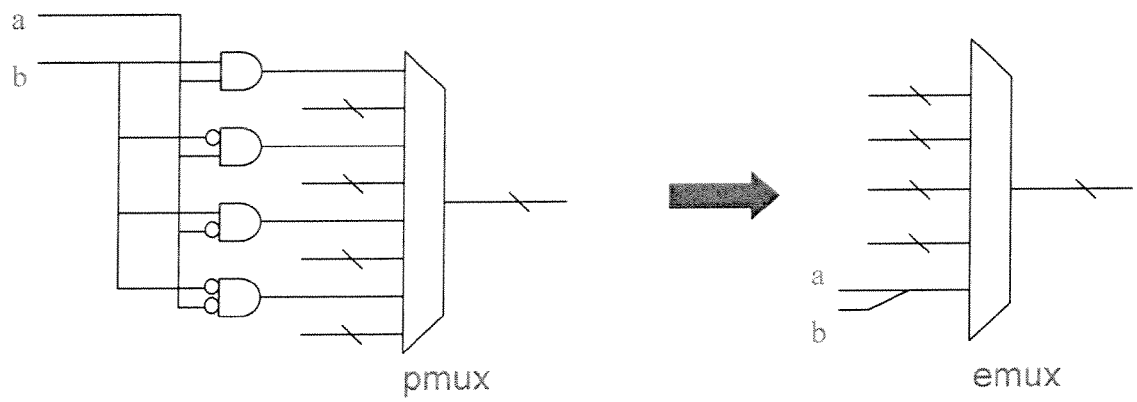
FIGS. 16A and 16B show examples of mux/pmux collapsing and timing driven decomposition.
Figure 16B:
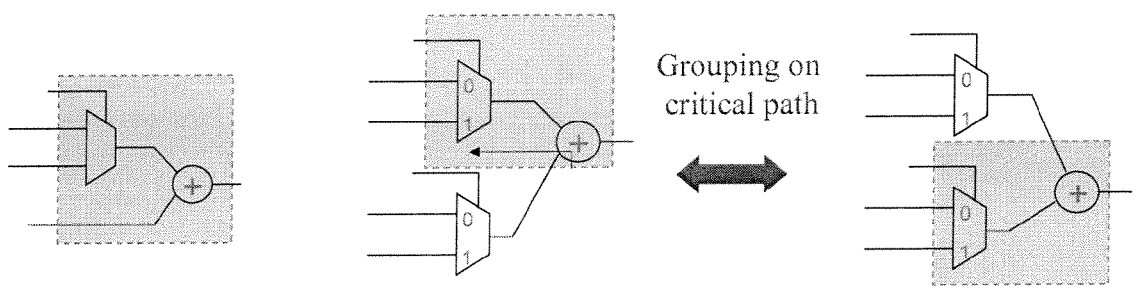

Yet another exemplary operation is the Mux/PMux (A PMux is defined as a mux with a one-hot encoded select) Collapsing and Timing Driven Decomposition, shown in FIGS. 16A and 16B. Large Muxes are very common in commercial circuits. Decomposing a mux is similar to the previously mentioned Adder tree and And/Or tree decomposition, but the select logic makes Mux decomposition more difficult, since moving a late arriving input within the tree impacts not only the tree structure, but also the select logic. As with the other decompositions, the present invention includes timing information based on placement and routing to determine the proper decomposition.

Operation 69 is updating routing. The present incremental iterative method provides good routability for the integrated circuit to improve the performance, noise sensitivity, yield, area, and power of the design. The incremental iterative process can gradually improve the wiring congestion on the chip, which the density of wiring resources required per unit area.

Many of the transforms mentioned have impact on the power consumed by the FPGA. For example, the manner in which a memory is decomposed (column form versus row) impacts the power it consumes. A row decomposition uses less power but requires additional multiplexing which introduces additional delay. The determination of a row versus column decomposition for optimizing power consumption can be performed in the present invention because with the present intimate connection between synthesis and placement, accurate delay information is available.

Operation 63 is a placement transform, or an update placement transform. The placement transform modifies the location of netlist instances such as RTL objects, unmapped instances or chip primitive level instances, and thereby determines, along with the router operation, the lengths and the delays of the nets in the circuits.

The placement transform can use various placement methods depending on the maturity of the netlist and the placement. In exemplary embodiments, the present placer employs incremental algorithms. An incremental algorithm is one which, in response to a small change in input, produces incremental changes in algorithm outputs. For example, global placement such as force directed placement can be used for placing less matured netlist and placement. The Force Directed Placement (FDP) method is one of the preferred choices for global placement in the present invention because it is an incremental method, where an iteration of FDP generates incremental placement changes. Typically, FDP uses a quadratic programming technique to model the nets and to determine how instances which are overlapping should be spread.

In an embodiment, the first step FDP is the solving of an unconstrained Quadratic Programming problem, which models only the nets interconnecting the instances. This initial solution usually has very high congestion. FDP then iteratively constructs spreading forces to move instances from areas of over-congestion (high instance usage) to areas of under-congestion (high resource availability). It is the nature of these iterative steps that make FDP an incremental algorithm. Changes to the netlist or other design state data can be made between theses iterations. When these state changes are incremental, the resultant change in FDP should also be incremental over what it would have been if the design state changes not been made.

There are various algorithms of FDP, but all share the basic concept of calculating the direction an instance should be move to resolve areas of overcongestion. In a given placement, the instances connected by a net are assumed to exert an attractive force on each other, proportional to the quadratic distance between the instances. In this previous work, all instances on repel each other and are attracted to all placement sites, even if the site's is not appropriate for the instance. Instances are then moved until the system achieves equilibrium in a minimum energy state. The FDP method is thus based on moving the instances in the direction of the total force exerted on them.

In one aspect, the present invention provides novel heterogeneous resource placement to address the heterogeneous resources from many modern reprogrammable chips and some ASIC design flows. For example, most PGA have various pre-defined chip resources such as IOs, DSPs, RAMs, LUTs, FFs, etc. which are available only at specific sites. These pre-defined resources are a result of prediffused nature of FPGA chips. Each resource site has a limit on the number of instances which may be placed at the site. For example, for the Altera Stratix-II chip, 16 or less LUTs and FFs may be place at a LAB site, and there are 3 distinct RAM sites holding 512 bytes, 4 K bytes, and 64 K bytes In exemplary embodiments, the present incrementally placement addresses heterogeneous resource problem. In FPGAs, structured ASIC, and some ASIC chips, resources may only be placed in certain sites which often are not distributed evenly over the placement area. Most global placers, including all previous FDP, have assumed homogeneous resources, where any instance, irrespective of its type, can be placed at any valid area within the chip boundary. This previous approach simplifies the placement problem, as all instances can be treated as simple rectilinear objects, and as long as these objects do not overlap and are placed inside the chip boundary, the placement will be legal. This simple rectangle model may allow instances of a certain type to be placed in a neighborhood with inadequate resources. This assumption neglects that for the heterogeneous resources, each resource has a specific set of sites in which instances must be placed. While this "combined" placement might not have any overlaps, when the actual resource types where considered, the placement might be far from legal. Some previous work in Simulated Annealing placers has taken resource information into account, but these placers have only been employed to place static mapped netlists, not RTL objects. Further, simulated annealing was used for much smaller designs and becomes difficult for large designs due to runtime.

In one aspect, the present invention models each distinct resource sites separately, so that in all placement transforms, the resource requirements are optimized by the placer. In one aspect, the present invention models an arbitrary number of site types, called "layers." These layers are used to determine the spreading force on each instance. In an embodiment, the layers are created in the initialization phases. A layer is created for each resource type which exists on the chip. The resources sites of a layer are recorded in the layer's supply distribution at their location. A distribution is a matrix like, 2-dimensional data structure with a value at location that gives the value of the supply at the location.

Each instance is assigned to the layer(s) for which it consumes resources. The instances which consume a single resource type are called primitive instances, and ones which consume multiple resources, non-primitives. An example of a non-primitive would be a state machine, which consumes both LUT and FF site types. The resources utilized by each instance assigned to a layer are recorded in the layers usage distribution. The present method provides for non-primitives, handled by recording their area on all of the layers for which they have resources. These usage contributions will, in turn, impact the force computations for each of the non-primitive's layers.

For a layer, the difference between its usage and supply distributions is the congestion distribution for that layer. As with previous FDP methods, this congestion distribution is used to compute forces for each instance on the layer.

The force for a non-primitive instance is computed by taking a weighted average of the forces from each of its resource layers or based on local congestion of those resources. The weighting applied to each layer can be a uniform weighting or a weighting which depends on the relative discreteness of the layer's resources. The discreteness of resources can be characterized by how far apart the resources are located, how sparse the resources are, or how uniform or non-uniform the resources are distributed.

In an embodiment, the force for a component with multiple possible implementations is computed similarly to the case of non-primitive instances. The force is computed by taking the weighted average of the forces from each of its implementation's resource layers. The weighting applied to each implementation's resources can be a uniform weighting or a weighting which depends on the probability that the given implementation will be chosen.

An advantage of the present invention is that an instance's forces depend only on other instances which use the same resource type, and resource supply for that type. For example, if instances A and B each has a portion using a resource C, then the force on the instance A (or on the portion of instance A using the resource C) depends on the portion of the instance B which uses the resource C, and also depends on the resource C which is available for placement. Instances on different layers, do not impact the spreading force of each other.

In one aspect, when the global placer terminates, each instance will be either at or near a valid site appropriate for its type so the placement may be legalized with little movement. This approach is novel as compared to previous FDP, which required that all instances be modeled as a single type and all resource areas were combined and the instances were then spread over the combined area.

In exemplary embodiments, the present invention architectural physical synthesis can provide improvement to resource utilization problem. It is often the case that chip resources exceed the requirements of the circuit. For example, in an FPGA design, the circuit to be implemented may require 150 LUTS when the chip or part it is implemented in has 256 LUTS. This problem is called the resource utilization problem. When the resource utilization problem is ignored, placers typically spread the circuit instances evenly over available resources, even though a better result may be achieved by a placement with varying densities over the resources. Previous placers have either ignored this problem or inserted extra "filler" instances. Filler instances are extra instances with no connectivity which are added to the circuit. The use of "filler" instances is also problematic as locations must be determined for these instances.

In exemplary embodiments, the present invention employs an area removal method to solve the resource utilization problem. As with force generation, each resource layer is considered separately. In the area removal method, the resources are utilized based on their quality with low-quality resources removed. A quality metric is first determined, and then the resource supply is analyzed to determine a ranking of the resources based on their quality. These low quality portions are then removed from consideration as placement sites by the placer. Since changes in placement influence the quality of the resources, the ranking and removal may be performed many times during the placement process. The process is thus well suited to the present invention's iterative and incremental improvement of the design state.

In an embodiment, the quality metric which is used to form the ranking is based on the resource's distance from usage. A byproduct of one method of computing forces is the convolution of the layer's density distribution with a Green function. The result of this convolution can be viewed as a topological map where the higher points indicate a demand for resources and the lower points represent the lack of demand. Since the distribution is composed of discrete boxes, these boxes can be sorted based on the convolution result. The resources to be removed can then be determined by traversing the supply and removing resources starting the resource with the lowest value in the convolution sorted order until the required resources are removed. In an aspect, the method can leave enough resources so that there is enough resources to meet the instance demand on that layer and so that the chip will be routable.

Alternatively, in other exemplary embodiments, the present invention employs a force range method to solve the resource utilization problem. In the force range method, the force acting on each instance is a weighted average of the forces from a plurality of force ranges. In an aspect, the short range weighted factor is proportional to the density of the instance in the short range region where a high local density resulted in a high force. This proportionality thus can enhance instance spreading to reduce overlap.

With the force ranges method, the force applied to an instance depends on the instance density in the neighborhood of the instance. The general idea is that an instance's spreading force should depend on the area needed to legalize the instances in its neighborhood. In the most extreme congested case where all instances are overlapping in a small neighborhood, the forces on each instance will be computed based on locations of all instances and all resources. In the least congested case, where an instance has no other instances in its vicinity, and is sitting directly on a resource, the instance will not have any force. For the cases in between these two extremes, the force depends on instances and resources in the area required to legalize the instance.

In an embodiment, the range of the force can be sectioned into local, medium and long range forces. In other embodiment, more or less force ranges could be used. In general, it is a trade-off with computational and memory resources to determine the legalization area for a neighborhood and the forces for each legalization range. In an aspect, the forces are computed by changing the size of the Green's function. The long range Green's function covers the whole placement area; the small Green's function covers a circular area with a radius of, for example, five times the average instance area; and the medium range Green's function has a radius of, for example, 10 times the average instance area. The force on an instance is the weighted sum of the instance's local, medium, and long range forces. The weights applied are determined by the density in the neighborhood of the instance. It the neighborhood is very dense, then the long range force will have a very high weight and the local weight will be 0. An instance in a low density area will have a zero long range weight, and a high local weight.

Another aspect of the present method is the ability to determine important architectural decisions that determine which resources should be used in implementing an architectural construct. At the architectural level there are many decisions such as, on an FPGA, whether a small RAM should be mapped to 512 bit RAM resources or 4 kbit RAM resources. Other examples included the decision of multiplier implementation and the previously stated cases such as adder tree decomposition. The present invention, though, is not limited to these specific examples. With the availability of placement information, the present invention refines important architectural implementation decisions that satisfy the design objectives. An exemplary example is the case where a 1 kbit memory may be assigned to either two 512 bit resources or a single 4 kbit resource. This implementation can be very critical to a successful implementation if the logic that the 1 kbit memory is connected to is located very closely to either 512 bit or 4 kbit sites. In the case where the 1 k memory's connecting logic is very close to 512 bit resources, and the 4 kbit resources are more distant, a non-optimal mapping to 4 k resources will result in a substantially lower performing circuit. The use of placement information to make this and other architectural decision is important.

In exemplary embodiment, the implementation refinement is handled by including a portion of the area of the flexible layer instance in the usage for each the layers that the instance may be mapped to. In the case of our 1 kbit example, the instance's area would be partially included in both the 512 layer and the 4 k layer. The force on the instance is determined either by taking a weighted sum of the forces for its potential layers or taking the force with least magnitude. The rational behind taking the force with the least magnitude is that the layer associated with this force should have a lower neighborhood density.

In other exemplary embodiment, the resource implementation starts by not including the instances which have multiple possible resource implementations into in any layer's usage. After the area removal operation has been performed for all layers, these flexible implementation instances are considered. For a flexible implementation instance, the potential supply of each of its possible layers is considered. The potential supply is the area removed from the full supply by the area removal operation. The potential supply on each of the implementation layers are examined to determine which layer has removed area that would be least disruptive if the instance was placed in this removed area. The instance is then assigned to that least disruptive layer.

The assign resources transform (operation 64) is responsible for determining the assignment of an instance to its specific chip resources. Various placement algorithms can be used for this operation including force directed placement, simulated annealing, Mongrel, min-cut placement, placement by numerical optimization, evolution-based placement, and other detail placement algorithms.

While most embodiments of the present invention are intended for use in an HDL design synthesis software program, the invention is not necessarily limited to such use. Although use of other languages and computer programs is possible (e.g. a computer program may be written to describe hardware and thus be considered an expression in an HDL and may be compiled or the invention, in some embodiments, may allocate and reallocate a logic representation, e.g. a netlist, which was created without the use of an HDL), embodiments of the present invention will be described in the context of use in HDL synthesis systems, and particularly those designed for use with integrated circuits which have vendor-specific technology/architectures. As is well known, the target architecture is typically determined by a supplier of programmable ICs. An example of a target architecture is the programmable lookup tables (LUTS) and associated logic of the integrated circuits which are field programmable gate arrays from Xilinx, Inc. of San Jose, Calif. Other examples of target architecture/technology include those well known architectures in field programmable gate arrays and complex programmable logic devices from vendors such as Altera, Lucent Technology, Advanced Micro Devices, and Lattice Semiconductor. For certain embodiments, the present invention may also be employed with application-specific integrated circuits (ASICs).

One embodiment of the present invention may be a circuit design and synthesis computer aided design software that is implemented as a computer program which is stored in a machine readable media, such as a CD ROM or a magnetic hard disk or an optical disk or various other alternative storage devices. Further, many of the methods of the present invention may be performed with a digital processing system, such as a conventional, general purpose computer system. Special purpose computers which are designed or programmed to perform only one function may also be used.

Figure 17:
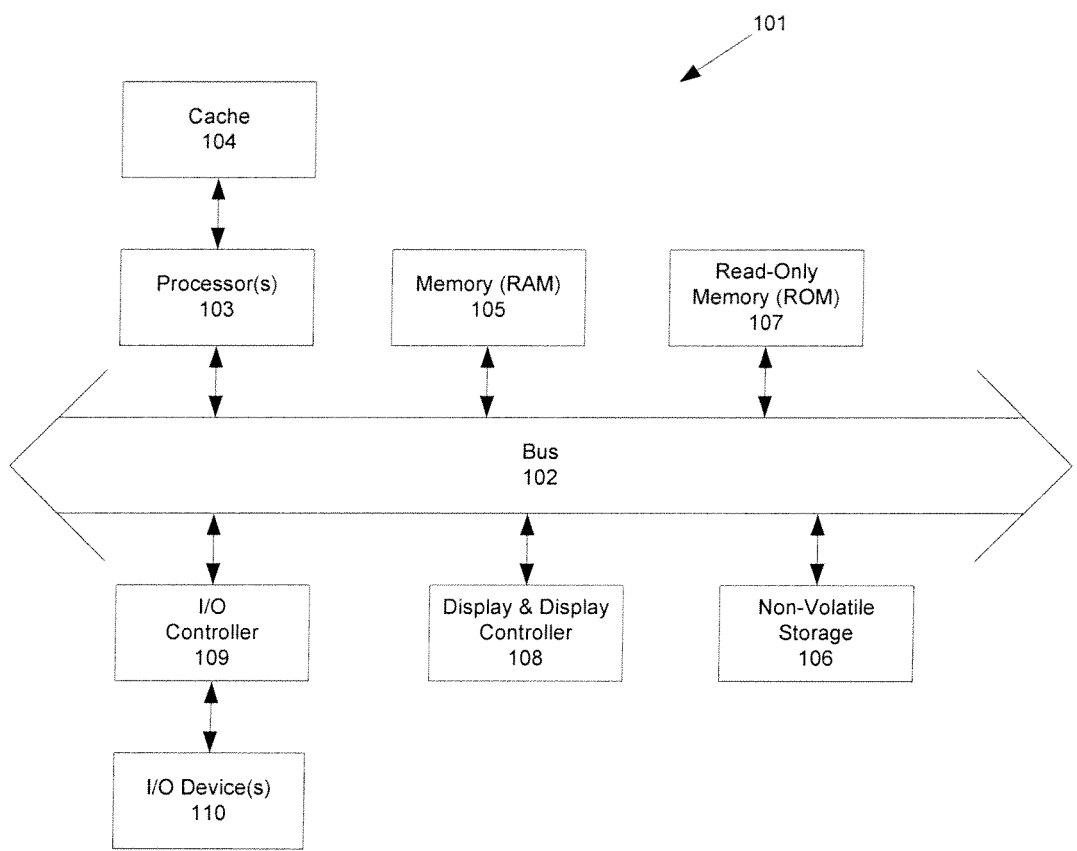
FIG. 17 shows a block diagram example of a data processing system which may be used with the present invention.

FIG. 17 shows one example of a typical computer system which may be used with the present invention. The computer system is used to perform logic synthesis of a design that is described in an HDL code. Note that while FIG. 17 illustrates various components of a computer system, it is not intended to represent any particular architecture or manner of interconnecting the components as such details are not germane to the present invention. It should be noted that the architecture of FIG. 17 is provided for purposes of illustration only and that a computer system or other digital processing system used in conjunction with the present invention is not limited to this specific architecture. It will also be appreciated that network computers and other data processing systems which have fewer components or perhaps more components may also be used with the present invention. The computer system of FIG. 17 may, for example, be an Apple Macintosh computer.

As shown in FIG. 17, the computer system 101, which is a form of a data processing system, includes a bus 102 which is coupled to a microprocessor 103 and a ROM 107 and volatile RAM 105 and a non-volatile memory 106. The microprocessor 103, which may be a microprocessor from Intel or Motorola, Inc. or IBM, is coupled to cache memory 104. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 17 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software, nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of designing an integrated circuit (IC), the method comprising:
   determining a placement decision for a portion of a design of the IC at a high level circuit representation;
   determining an incomplete placement information including a resource availability for the portion of the IC based on the placement decision; and
   determining one or more synthesis transforms based on the resource availability for the portion of the design of the IC at the high level circuit representation, wherein at least the determining the incomplete placement information, and determining the one or more synthesis transforms are continuously repeated until an optimized design state is reached, wherein at least one of the determining the placement decision, the determining the incomplete placement information, and determining one or more synthesis transforms is performed using a processor.

2. A method as in claim 1 wherein the high level circuit representation includes at least one component which has not had an implementation, in a chip primitive, selected for the component, and the optimized design state includes a chip primitive level netlist.

3. A method as in claim 1 further comprising:
repeating a synthesis transform for the portion of the high level circuit presentation previously synthesized.

4. A method as in claim 1 further comprising:
determining placement decisions while synthesis from the high level circuit description is still to be completed.

5. A method as in claim 1 wherein the synthesis transform is one of:
an adder tree decomposition;
an and/or gate decomposition;
a flattening of the netlist;
an electronic multiplexer decomposition;
a logic optimization;
a logic decomposition;
an undo/do resource sharing;
a logic replication;
a logic factorization;
a Shannon expansion;
a bit splicing;
a mux/pmux collapsing and timing driven decomposition; and
a detour removal.

6. A method as in claim 1 wherein the synthesis transform assembles RTL components compiled from the high level circuit representation.

7. A method as in claim 1 wherein the synthesis transform is incremental.

8. A method as in claim 1 wherein the synthesis transform is partial synthesis for a few objects for the portion of the circuit design.

9. A non-transitory machine readable storage medium containing a plurality of executable instructions, which when executed on a digital processing system cause said digital processing system to perform operations to design an integrated circuit (IC), said operations comprising:
determining a placement decision for a portion of a design of the IC at a high level circuit representation;
determining an incomplete placement information including a resource availability for the portion of the IC based on the placement decision; and
determining one or more synthesis transforms based on the resource availability for the portion of the design at the high level circuit representation, wherein at least the determining the incomplete placement information, and determining the one or more synthesis transforms are continuously repeated until an optimized design state is reached.

10. A non-transitory machine readable storage medium as in claim 9 wherein the high level circuit representation includes at least one component which has not had an implementation, in a chip primitive, selected for the component, and the optimized design state includes a chip primitive level netlist.

11. A non-transitory machine readable storage medium as in claim 9 further comprising instructions that cause the system to perform operations comprising
repeating a synthesis transform for the portion of the high level circuit presentation previously synthesized.

12. A non-transitory machine readable storage medium as in claim 9 further comprising instructions that cause the system to perform operations comprising
determining placement decisions while synthesis from the high level circuit description is still to be completed.

13. A non-transitory machine readable storage medium as in claim 9 wherein the synthesis transform is one of:
an adder tree decomposition;
an and/or gate decomposition;
a flattening of the netlist;
an electronic multiplexer decomposition;
a logic optimization;
a logic decomposition;
an undo/do resource sharing;
a logic replication;
a logic factorization;
a Shannon expansion;
a bit splicing;
a mux/pmux collapsing and timing driven decomposition; and
a detour removal.

14. A non-transitory machine readable storage medium as in claim 9 wherein the synthesis transform assembles RTL components compiled from the high level circuit representation.

15. A non-transitory machine readable storage medium as in claim 9 wherein the synthesis transform is incremental.

16. A non-transitory machine readable storage medium as in claim 9 wherein the synthesis transform is partial synthesis for a few objects for the portion of the circuit design.

17. A data processing system to design an integrated circuit (IC), the data processing system comprising:
means for determining a placement decision for a portion of a design of the IC at a high level circuit representation;
means for determining an incomplete placement information including a resource availability for the portion of the IC based on the placement decision; and
means for determining one or more synthesis transforms based on the resource availability for the portion of the design at the high level circuit representation, wherein at least one of the determining the incomplete placement information, and determining one or more synthesis transforms are continuously repeated until an optimized design state is reached.

18. A data processing system as in claim 17 wherein the high level circuit representation includes at least one component which has not had an implementation, in a chip primitive, selected for the component, and the optimized design state includes a chip primitive level netlist.

19. A data processing system as in claim 17 further comprising
means for repeating a synthesis transform for the portion of the high level circuit presentation previously synthesized.

20. A data processing system as in claim 17 further comprising:
means for determining placement decisions while synthesis from the high level circuit description is still to be completed.

21. A data processing system as in claim 17 wherein the synthesis transform is one of:
an adder tree decomposition;
an and/or gate decomposition;
a flattening of the netlist;
an electronic multiplexer decomposition;
a logic optimization;
a logic decomposition;

an undo/do resource sharing;
a logic replication;
a logic factorization;
a Shannon expansion;
a bit splicing;
a mux/pmux collapsing and timing driven decomposition; and
a detour removal.

22. A data processing system as in claim 17 wherein the synthesis transform assembles RTL components compiled from the high level circuit representation.

23. A data processing system as in claim 17 wherein the synthesis transform is incremental.

24. A data processing system as in claim 17 wherein the synthesis transform is partial synthesis for a few objects for the portion of the circuit design.

* * * * *